(12) United States Patent
Murata et al.

(10) Patent No.: US 12,097,579 B2
(45) Date of Patent: Sep. 24, 2024

(54) TIG WELDING TORCH EQUIPPED WITH NARROW NOZZLE FOR SPOT WELDING, AND ELECTRODE NOZZLE USED IN SAME

(71) Applicant: MURATA WELDING LABORATORIES, INCORPORATED, Osaka (JP)

(72) Inventors: Akihisa Murata, Osaka (JP); Tadasuke Murata, Osaka (JP); Manabu Tanaka, Takatsuki (JP)

(73) Assignee: MURATA WELDING LABORATORIES, INCORPORATED, Osaka (JP)

( * ) Notice: Subject to any disclaimer, the term of this patent is extended or adjusted under 35 U.S.C. 154(b) by 711 days.

(21) Appl. No.: 17/413,284

(22) PCT Filed: Dec. 23, 2019

(86) PCT No.: PCT/JP2019/050305
§ 371 (c)(1),
(2) Date: Jun. 11, 2021

(87) PCT Pub. No.: WO2020/137949
PCT Pub. Date: Jul. 2, 2020

(65) Prior Publication Data
US 2022/0063012 A1    Mar. 3, 2022

(30) Foreign Application Priority Data

Dec. 25, 2018    (JP) .................................. 2018-241404

(51) Int. Cl.
*B23K 9/29*    (2006.01)
*B23K 9/16*    (2006.01)
(Continued)

(52) U.S. Cl.
CPC .............. *B23K 9/296* (2013.01); *B23K 9/164* (2013.01); *B23K 9/167* (2013.01); *B23K 9/325* (2013.01)

(58) Field of Classification Search
CPC ........ B23K 9/296; B23K 9/164; B23K 9/167; B23K 9/325
See application file for complete search history.

(56) References Cited

U.S. PATENT DOCUMENTS

| 2,683,791 A | 7/1954 | Ruehlemann et al. |
| 2013/0277337 A1* | 10/2013 | Murata .................. B23K 9/164 219/74 |

FOREIGN PATENT DOCUMENTS

| JP | S61-182677 U | 11/1986 |
| JP | 2014-100734 A | 6/2014 |

(Continued)

OTHER PUBLICATIONS

International Search Report issued in PCT/JP2019/050305; mailed Feb. 4, 2020.

*Primary Examiner* — Brian W Jennison
(74) *Attorney, Agent, or Firm* — Studebaker & Brackett PC

(57) ABSTRACT

The present invention enables even a beginner to acquire the technique easily and perform suitable spot welding, and achieves improved workability, improved welding quality, improved productivity, and the like. The present invention includes a torch body 2 for passing a shielding gas, a tungsten electrode rod 5 inserted into the torch body 2 and connected to a cathode, a constricted nozzle 6 for supporting a distal end portion of the tungsten electrode rod 5 concentrically, defining a gas passage 6e between the tungsten electrode rod 5 and the constricted nozzle 6 for flowing a shielding gas G, and discharging the shielding gas G from the constricted nozzle 6 at a higher speed than the shielding (Continued)

gas G discharged from the distal end of the torch body 2, and a cylindrical electrode nozzle 7 having conductivity arranged concentrically with the tungsten electrode rod 5 on the outer circumference of the constricted nozzle 6, connected to the anode via a ground cable 18, and configured to have a tapered shape at a distal end portion, wherein the tapered distal end portion is located further outside than the distal end portion of the tungsten electrode rod 5, gas vent ports 7c and 7d of the shielding gas G are provided on the electrode nozzle 7.

14 Claims, 20 Drawing Sheets

(51) Int. Cl.
      *B23K 9/167*       (2006.01)
      *B23K 9/32*       (2006.01)

(56)                     References Cited

FOREIGN PATENT DOCUMENTS

WO          2013157036  A1    10/2013
WO          2016166962  A1    10/2016

\* cited by examiner (A)

(B)

(A)

(B)

(C)

(D)

(A)

Butt joints (B)

Square joints (C)

Edge joints (D)

T-joints (E)

Lap joints

TIG WELDING TORCH EQUIPPED WITH NARROW NOZZLE FOR SPOT WELDING, AND ELECTRODE NOZZLE USED IN SAME

TECHNICAL FIELD

The present invention relates to a TIG welding torch with a constricted nozzle for spot welding (tack welding) metal plates (base material), such as stainless steel plates, steel plates, copper plates, and aluminum plates, in particular, relates to a TIG welding torch with a constricted nozzle by improving a TIG welding torch with non-consumable electrodes, and an electrode nozzle used therein.

BACKGROUND ART

In general, spot welding (tack welding) is used when two metal plates are tack-welded, and when a very high bonding strength is not required at the joining point of the metal plates or the like. Lap joints, butt joints, corner joints, edge joints, T joints, or the like, are used as joints in performing spot welding (tack welding).

Conventionally, to spot-weld two overlapped metal plates, resistance welding is widely utilized, as shown in FIG. 25(A), by sandwiching the point to be welded of the two metal plates W between the electrodes 30, applying appropriate pressure, and applying a current, thereby welding portions are melted and joined by Joule heat.

However, resistance welding is unsuitable for spot welding (tack welding) of metal plates W such as copper plates and aluminum plates with low electrical resistance. For spot welding metal plates W such as copper plates or aluminum plates, as shown in FIG. 25(B)-(D), laser welding using a laser beam from an emission unit 31 (laser head), plasma welding using a plasma welding torch 32 (e.g., see Patent Document 1), or TIG welding using a TIG welding torch 33 (e.g., see Patent Documents 2 and 3) is used.

However, when metal plate W such as copper plates or aluminum plates having less electrical resistance is spot-welded by laser welding, plasma welding, or TIG welding, the following problem occurs.

That is, the two metal plates W to be spot-welded must be in close contact under pressure. This is because if a gap occurs between the two metal plates W, the arc heat is not transferred to both metal plates W, resulting in incomplete joining. Moreover, in the worst case, only the upper metal plate W may melt and the two metal plates W cannot be joined. Therefore, a pressing jig is required for the close contact under the pressure of the two metal plates W, so the workability is low.

Further, the height (or position) of the laser beam emission unit 31, the plasma welding torch 32, or the TIG welding torch 33 with respect to the metal plate W to be spot-welded are required to be kept constant respectively. This is because if the height (or position) of the emission unit 31, the plasma welding torch 32, or the TIG welding torch 33 varies, the heat input density does not become constant, resulting in unstable penetration. Therefore, the laser beam emitting unit 31, the plasma welding torch 32, or the TIG welding torch 33 need a jig for keeping their height (or position) with respect to the metal plates W constant, so the workability is low.

In addition, when two metal plates W are tack-welded by spot welding using TIG welding torch 33, butt joints, corner joints, edge joints, T-joints, lap joints, etc. are used for the shape of the joint as shown in FIGS. 26(A) to (E). However, in order to perform good spot welding, it is necessary to pay attention to the following points.

(1) Set the target point so that the arc can move reliably to the spot welding point.
(2) Keep the distance between the tungsten electrode rod and the metal plate W constant so that the arc length becomes constant.
(3) Prevent short circuit between the tungsten electrode rod and the metal plate W.

However, regarding TIG welding using TIG welding torch 33, there is a problem that in order to set the target point of spot welding, keep the arc length constant, and prevent short circuit, the operator's experience is required, and that good spot welding can not be performed unless an experienced person is skilled because of individual differences in skill.

Further, when the tungsten electrode rod and the metal plate W are short-circuited, there is a problem that since the tip of the tungsten electrode rod is consumed, it is necessary to polish the tungsten electrode rod, so the workability extremely deteriorates.

PRIOR-ART DOCUMENTS

Patent Literature

Patent literature 1: Japanese Laid-Open Utility Model Publication No. S61-182677
Patent literature 2: Japanese Patent Publication No. 5602974
Patent literature 3: Japanese Patent Publication No. 5887445

SUMMARY OF INVENTION

Technical Problem

The present invention has been made in view of such problems, the object is to provide a TIG welding torch having a constricted nozzle and an electrode nozzle used therein for spot welding, which is able to easily set the target point of the spot welding (tack-welding), to maintain a constant arc length, to eliminate the short-circuit phenomenon between the tungsten electrode rod and the metal plate, to eliminate the oxidation phenomenon of the tungsten electrode rod, and further to improve workability, welding quality, and productivity, but do not be affected by wind during spot welding, as a result, even beginners can easily perform good spot welding.

Solution to Problem

To achieve the above object, a first aspect of the TIG welding torch with a constricted nozzle for spot welding according to the present invention is a TIG welding torch with a constricted nozzle for spot welding, comprising, a torch body for passing a shielding gas, a tungsten electrode rod detachably attached to the torch body by insertion through an electrode collet, and connected to a cathode, a constricted nozzle configured to support a distal end portion of the tungsten electrode rod concentrically, and defining a gas passage through which the shielding gas flows between the tungsten electrode rod and the constricted nozzle for discharging the shielding gas discharged from the gas passage at a higher speed than the shielding gas discharged from a tip of the torch body, and an electrode nozzle arranged concentrically with the tungsten electrode rod on an outer circumference of the constricted nozzle, the electrode nozzle having a distal end portion formed in a tapered shape, which is configured to have a tip located outward from a tip of the tungsten electrode rod, the electrode nozzle configured to have a cylindrical shape, and have conductivity for connecting to an anode via a ground cable, wherein the electrode nozzle is provide with a gas vent port for the shielding gas.

A second aspect of the TIG welding torch with a constricted nozzle for spot welding according to the present invention comprising: a torch body, a tungsten electrode rod detachably attached to the torch body by insertion through an electrode collet capable of passing a shielding gas, and connected to a cathode, a constricted nozzle configured to support a distal end portion of the tungsten electrode rod concentrically, and define a gas passage through which the shielding gas flows between the tungsten electrode rod and the constricted nozzle, and an electrode nozzle arranged concentrically with the tungsten electrode rod on an outer circumference of the constricted nozzle, the electrode nozzle having a distal end portion formed in a tapered shape, the tapered shape configured to have a tip located outward from a tip of the tungsten electrode rod, the electrode nozzle configured to have a cylindrical shape, the electrode nozzle having conductivity for connecting to an anode via a ground cable, wherein the electrode nozzle is provided with a gas vent port for the shielding gas.

A third aspect of the TIG welding torch with a constricted nozzle of the present invention is according to the first aspect, wherein the electrode nozzle comprises: a cylindrical portion attached to a distal end portion of the torch body and connectable to the ground cable connected to the anode, a cylindrical tapered portion continuously provided with the cylindrical portion and configured to have a tapered shape toward the distal end portion side, a plurality of hole-shaped gas vent ports provided at predetermined intervals in the circumferential direction in the cylindrical portion for discharging the shielding gas in the electrode nozzle to the outside, and a plurality of groove-shaped gas vent ports provided at predetermined intervals in the circumferential direction at a tip of the cylindrical portion for discharging the shielding gas in the electrode nozzle to the outside.

A fourth aspect of the TIG welding torch with a constricted nozzle of the present invention is according to the first aspect, wherein the electrode nozzle comprises: a cylindrical portion attached to a distal end portion of the torch body and connectable to the ground cable connected to the anode, a cylindrical tapered portion continuously provided with the cylindrical portion and formed in a tapered shape toward the distal end portion side, a plurality of hole-shaped gas vent ports provided at predetermined intervals in the circumferential direction in the cylindrical portion for discharging the shielding gas in the electrode nozzle to the outside, a plurality of groove-shaped gas vent ports at predetermined intervals in the circumferential direction at a tip of the cylindrical tapered for discharging the shielding gas in the electrode nozzle to the outside, and a V-shaped positioning groove provided along a diameter direction at a tip of the cylindrical tapered portion and configured to be fitted into a corner of a corner joint.

A fifth aspect of the TIG welding torch with a constriction nozzle of the present invention is according to the first aspect, wherein the electrode nozzle comprises: a cylindrical portion attached to a distal end portion of the torch body and connectable to the ground cable connected to the anode, a cylindrical tapered portion continuously provided with the cylindrical portion and formed in a tapered shape toward the distal end portion side, and a plurality of hole-shaped gas vent ports provided at predetermined intervals in the circumferential direction in the cylindrical portion for discharging the shielding gas in the electrode nozzle to the outside.

A sixth aspect of the TIG welding torch with a constricted nozzle of the present invention is according to any one of the third aspect, the fourth aspect, and the fifth aspect, wherein the electrode nozzle further comprises a terminal fastener for connecting a terminal of the ground cable.

A seventh aspect of the TIG welding torch with a constricted nozzle of the present invention according to any one of the third aspect, the fourth aspect, the fifth aspect, and the sixth aspect further comprises a cylindrical heat insulating cover larger than an outer diameter of the cylindrical portion, the cylindrical heat insulating cover is provided on an outer peripheral surface of the cylindrical portion of the electrode nozzle concentrically, and the cylindrical heat insulating cover defines an annular cooling passage, through which the shielding gas discharged from the plurality of hole-shaped gas vent ports flows between the cylindrical portion and the heat insulating cover.

An eighth aspect of the TIG welding torch with a constricted nozzle of the present invention is according to the first aspect, wherein the torch body comprises a cylindrical torch body having a cylindrical shape, conductivity, and a plurality of discharge holes in a distal end surface for discharging shielding gas to the outer circumference of the constricted nozzle, and a cylindrical insulator having an insulating property and fitted to an outer peripheral surface of the torch main body, wherein a proximal end portion of the electrode nozzle is fitted and fixed to an outer peripheral surface of a distal end portion of the cylindrical insulator.

A ninth aspect of the TIG welding torch with a constricted nozzle of the present invention according to the eighth aspect, further comprises a gas lens for rectifying the shielding gas discharged from the discharge hole on a distal end surface of the torch main body of the torch body.

A tenth aspect of a TIG welding torch with a constricted nozzle of the present invention is according to the second aspect, wherein the electrode nozzle is vertically divided into two parts, wherein the parts comprise a nozzle main body having a cylindrical shape and conductivity, being attached to a distal end portion of the torch body and connectable to the ground cable connected to the anode and a cylindrical nozzle tip having a cylindrical shape, conductivity, and configured to have a tapered shape at a distal end portion, wherein the nozzle tip has a cylindrical shape being detachably attached to a distal end portion of the nozzle main body.

An eleventh aspect of the TIG welding torch with a constricted nozzle of the present invention is according to the tenth aspect, wherein the nozzle main body further comprises a terminal fastener for connecting terminals of the ground cable.

A twelfth aspect of the TIG welding torch with a constricted nozzle of the present invention is according to the tenth aspect, wherein the nozzle tip is configured to have a V-shaped positioning groove provided on a distal end surface of the nozzle tip along a diameter direction of the nozzle tip, the V-shaped positioning groove being capable of fitting to a corner of a corner joint.

A thirteenth aspect of the TIG welding torch with a constricted nozzle of the present invention is according to the tenth aspect, wherein a facing-shaped positioning surface in contact with a corner portion of the T-joint in a surface contact state is provided on an outer peripheral surface of a distal end portion of the nozzle tip.

A first aspect of the electrode nozzle of the present invention is used in the TIG welding torch with a constricted nozzle according to any one of the first to thirteenth aspects.

Effect of Invention

In the TIG welding torch with a constricted nozzle according to the present invention, the constricted nozzle for concentrically supporting the distal end portion of the tungsten electrode rod and the distal end portion of the tungsten electrode protruding from the distal end of the constricted nozzle are concentrically covered with a cylindrical electrode nozzle having conductivity and a tapered shape at the distal end, the distance between the distal end of the tungsten electrode rod and the distal end of the electrode nozzle is maintained constantly, the tungsten electrode rod is used as a cathode, and the electrode nozzle is connected to the ground cable as an anode. Further, in the TIG welding torch with a constricted nozzle according to the present invention, the electrode nozzle includes the cylindrical portion attached to the distal end portion of the torch body, and a cylindrical tapered portion continuously provided with the cylindrical portion and configured to have a tapered shape toward the distal end portion side, while a plurality of hole-shaped gas vent ports are provided in the cylindrical portion, a plurality of groove-shaped gas vent ports are provided at the distal end of the cylindrical tapered portion. Moreover, the TIG welding torch with a constricted nozzle according to the present invention is configured to have a V-shaped positioning groove fitted into a corner of a corner joint, provided at the distal end of the cylindrical tapered portion of the electrode nozzle. Furthermore, the TIG welding torch with a constricted nozzle according to the present invention is configured to have a cylindrical heat insulating cover larger than an outer diameter of the cylindrical portion concentrically provided on the outer peripheral surface of the cylindrical portion of the electrode nozzle, and an annular cooling passage, through which the shielding gas discharged from the plurality of hole-shaped gas vent ports in the cylindrical portion flows, is formed between the cylindrical portion and the heat insulating cover. In addition, in the TIG welding torch with a constricted nozzle according to the present invention, the electrode nozzle is divided into upper and lower two parts which include the nozzle main body having conductivity and a cylindrical shape, attached to the distal end portion of the torch body, and the nozzle tip having conductivity and a cylindrical shape, configured to have a tapered shape at a distal end portion, wherein the nozzle tip is detachably connected to the distal end portion of the nozzle main body. Further, in the TIG welding torch with a constricted nozzle according to the present invention, the nozzle tip is configured to have the V-shaped positioning groove fitted to a corner portion of a corner joint on the distal end surface of the nozzle tip. Moreover, the TIG welding torch with a constricted nozzle according to the present invention is configured to have a facing-shaped positioning surface in contact with a corner portion of the T joint in a surface contact state on the outer peripheral surface of the distal end portion of the nozzle tip.

As a result, the TIG welding torch with a constricted nozzle according to the present invention can exhibit the following excellent function effect.

(1) Using the TIG welding torch with a constricted nozzle according to the present invention, when applying a voltage only for a predetermined time in a state where the tip of the electrode nozzle is brought into contact with a metal plate (base material), an arc (arc plasma) is generated between the tip of the tungsten electrode rod and the metal plate, so it is possible to melt the metal plate with the heat of the arc. Therefore, it is possible to perform spot welding (tack welding) in a state of contacting the tip of the electrode nozzle having a tapered shape at the distal end portion with a predetermined position of the metal plate, and it is possible to easily determine the target position of the spot welding.

(2) In the TIG welding torch with a constricted nozzle according to the present invention, since the distance between the distal end of the tungsten electrode rod and the distal end of the electrode nozzle is constant, it is possible to keep the arc length constant, obtain a narrow bead width and deep penetration, and form a molten pool having excellent reproducibility.

(3) In the TIG welding torch with a constricted nozzle according to the present invention, since the tip of the tungsten electrode rod is covered with the electrode nozzle, it is possible to eliminate the short-circuit phenomenon of the tungsten electrode rod and the metal plate.

(4) In the TIG welding torch with a constricted nozzle according to the present invention, since the tip of the tungsten electrode rod is located in the electrode nozzle, and the shielding gas is flowing in the electrode nozzle, it is possible to prevent the oxidation of the tungsten electrode rod by oxygen, and to prolong the life of the tungsten electrode rod.

(5) In the TIG welding torch with a constricted nozzle according to the present invention, since the distal end of the tungsten electrode rod is covered with the electrode nozzle, the arc or the shielding gas is not affected by wind during welding, it is possible to prevent the oxygen from being mixed into the molten pool and to improve the quality of the spot welding.

(6) Since the TIG welding torch with a constricted nozzle according to the present invention has a constricted nozzle for concentrically supporting the tungsten electrode rod and flowing the shielding gas at a high speed around the tungsten electrode rod, at the time of replacement of the tungsten electrode rod, it is possible to accurately and reliably set the tungsten electrode rod at a predetermined position, and it is possible to increase the energy density of the arc by thermal pinch effect, so that deep penetration into the base material may be obtained.

(7) In the TIG welding torch with a constricted nozzle according to the present invention, since the distal end of the tungsten electrode rod is covered with the electrode nozzle, it is possible to minimize the leaking of the arc light to the outside, the operator does not have to look directly on the intense light from the arc, and eyes and skins of the operator are not exposed to harmful ultraviolet or infrared rays, so that the welding operation may be performed safely.

(8) In the TIG welding torch with a constricted nozzle according to the present invention, both the cathode and the anode can be attached to the torch itself, and further, the torch side can be used as the cathode and the metal plate side (base material side) can be used as the anode.

(9) Since the TIG welding torch with a constricted nozzle according to the present invention is configured to have a plurality of gas vent ports provided on the electrode nozzle, gas turbulence in the electrode nozzle can be prevented, and metal vapor generated from the molten pool can be discharged to the outside from the gas vent ports together with the shielding gas. In particular, by disposing a plurality of groove-shaped gas vent ports at the distal end of the cylindrical tapered portion of the electrode nozzle, it is possible to reliably and satisfactorily discharge the generated metal vapor from the groove-shaped gas vent ports to the outside. As a result, the TIG welding torch with a constricted nozzle according to the present invention can prevent reattachment and contamination of the metal vapor to the molten metal, and perform high-quality spot welding, also, the metal vapor is prevented from adhering to the distal end portion of the tungsten electrode rod, so that it is possible to prolong the life of the tungsten electrode rod.

(10) Since the TIG welding torch with a constricted nozzle according to the present invention is configured to have a V-shaped positioning groove provided at the distal end of the cylindrical tapered portion of the electrode nozzle, when performing spot welding on a corner joint, it is possible to reliably and easily set the target position for the spot welding.

(11) The TIG welding torch according to the present invention is configured to have an annular cooling passage, through which the shielding gas flows, provided between the outer peripheral surface of the cylindrical portion of the electrode nozzle and the cylindrical heat insulating cover, thereby the electrode nozzle heated at the time of spot welding may be cooled, and the operator is less likely to touch the heated electrode nozzle so that the welding work may be performed safely.

(12) In the TIG welding torch with a constricted nozzle according to the present invention, the electrode nozzle is divided into upper and lower parts, the upper part is a nozzle main body, and the lower part is a cylindrical nozzle tip, the nozzle main body is connected to the ground cable, and the nozzle tip is detachable from the nozzle main body. Therefore, by replacing the nozzle tip with a nozzle tip having another shape, for example, a V-shaped positioning groove fitted into a corner of a corner joint, or a nozzle tip having an facing-shape positioning surface in contact with the corner of the T joint in a surface contacting state, correspondence to various joint shapes becomes possible. In addition, since only the nozzle tip may be replaced, the attachment/detachment operation of the ground cable connected to the nozzle main body becomes unnecessary. Furthermore, by using different materials having conductivity to make the nozzle main body and the nozzle tip, for example, when the nozzle main body is made of brass and the nozzle tip is made of copper, cost reduction can be achieved, as compared with the entire electrode nozzle made of copper.

As described above, since the TIG welding torch with a constricted nozzle according to the present invention can exhibit the above-mentioned function effect, even a novice person can easily acquire the art, perform good spot welding (tack welding), and can further improve the workability, the welding quality, and the productivity.

The electrode nozzle according to the present invention can suitably provide the TIG welding torch with the constricted nozzle.

DESCRIPTION OF EMBODIMENTS

Figure 1:
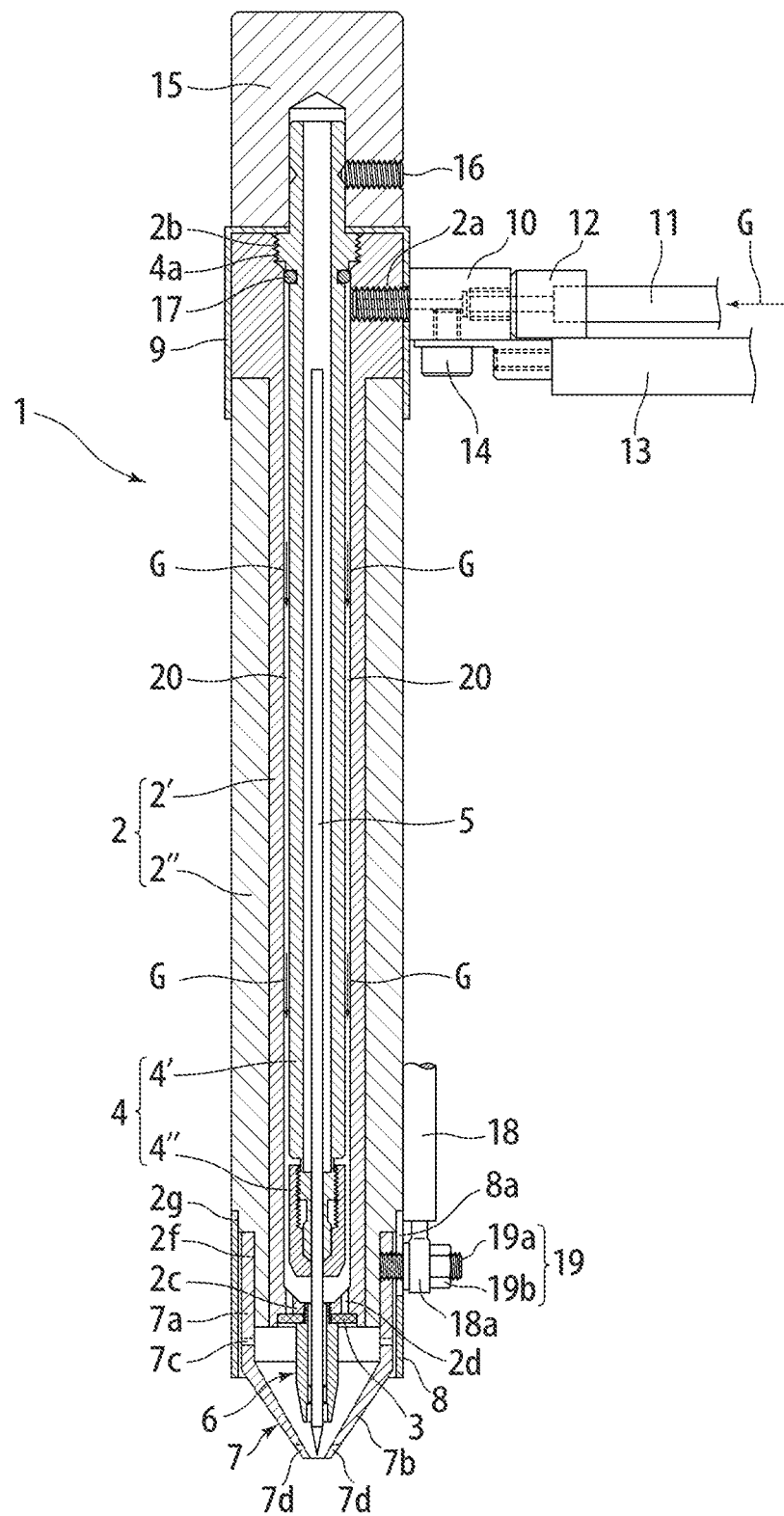
FIG. 1 is a longitudinal sectional front view of a TIG welding torch with a constricted nozzle for spot welding according to a first embodiment of the present invention.

Hereinafter, embodiments of the present invention will be described in detail with reference to the figures. FIGS. 1 to 5 show a TIG welding torch 1 with a constriction nozzle for spot welding according to the first embodiment of the invention. The TIG welding torch 1 with the constricted nozzle is used for spot welding (tack welding) of two metal plates W (hereinafter referred to as base material W) such as stainless steel plates, steel plates, copper plates, and aluminum plates. Incidentally, stack weld of two base metal W by spot welding (tack welding) are performed for the following shaped joints, such as butt joint, corner joint, helical joint, T-joint, lap joint, etc.

The TIG welding torch 1 with a constricted nozzle, as shown in FIGS. 1 to 5, is provided with a cylindrical torch body 2 for passing a shielding gas G, a gas lens 3 provided at a distal end portion of the torch body 2 for rectifying the shield gas G discharged from the distal end of the torch body 2, an electrode collet 4 insertable into the torch body 2, a tungsten electrode rod 5 detachable into the electrode collet 4, a constricted nozzle 6 for concentrically supporting the distal end portion of the tungsten electrode rod 5, defining an annular gas passage 6e, through which the shielding gas G flows, between the tungsten electrode rod 5 and the constricted nozzle 6, and discharging the shielding gas G discharged from the gas passage 6e at a higher speed than the shielding gas G discharged from the tip of the torch body 2, a cylindrical electrode nozzle 7 having conductivity, provided concentrically with the tungsten electrode rod 5 on the outer circumference of the constricted nozzle 6, configured to have a tapered shape at the distal end portion wherein a tip of the tapered shape is located outward from a tip of the tungsten electrode rod 5, and having gas vent ports 7c, 7d for the shielding gas G, and an insulating cover 8 provided on the outer peripheral surface of the cylindrical portion of the electrode nozzle 7 and defining an annular cooling passage, through which the shielding gas G flows between the outer peripheral surface of the electrode nozzle 7 and the insulating cover 8, while the tungsten electrode rod 5 is an cathode, the electrode nozzle 7 is an anode connected to the ground cable 18.

In FIG. 1, the reference numeral 9 denotes an insulating cover covering the proximal end portion of the torch body 2 (the upper end portion of the torch body 2 shown in FIG. 1), the numeral 10 denotes a cable connection fitting screwed and fixed to the torch body 2 for supplying the shielding gas G into the torch body 2, the numeral 11 denotes a gas hose for supplying the shielding gas connected to the cable connection fitting 10 via a gas joint 12, the numeral 13 denotes a torch cable connected and fixed to the cable connection fitting 10 by a cable set screw 14, the numeral 15 denotes an electrode collet knob fixed to the proximal end portion of the electrode collet 4 (the upper end portion of the electrode collet 4 shown in FIG. 1) by a set screw 16, the numeral 17 denotes an O-ring for sealing between the torch body 2 and the electrode collet 4, and the numeral 18 denotes an earth cable fixed to the electrode nozzle 7 by a terminal fastener 19.

Further, a gas such as Ar or He is used as the shielding gas G. The shielding gas G is changed according to the material of the base material W. For example, Ar or Ar+$H_2$ (5%) is used to weld stainless steels, and Ar+He (3%) is used to weld aluminum alloys.

The torch body 2 includes a cylindrical torch main body 2' made of a metal material, such as an aluminum alloy, having a large diameter proximal end portion (the upper end portion of the torch body 2 shown in FIG. 1), and a cylindrical insulator 2" made of an insulating material, such as ceramic or synthetic rubber, and fitted to an outer peripheral surface of a small-diameter portion of the torch main body 2'. A female screw 2a for screwing and fixing the cable connection fitting 10 is provided on the peripheral wall of the large diameter portion of the torch main body 2'. The cable connection fitting 10 is screwed and fixed to the female screw 2a.

Further, on the inner peripheral surface of the proximal end portion opening of the torch main body 2', a female screw 2b is provided for vertically movable screwing the electrode collet 4, and an O-ring 17 is fitted for sealing to prevent gas leakage.

Figure 3:
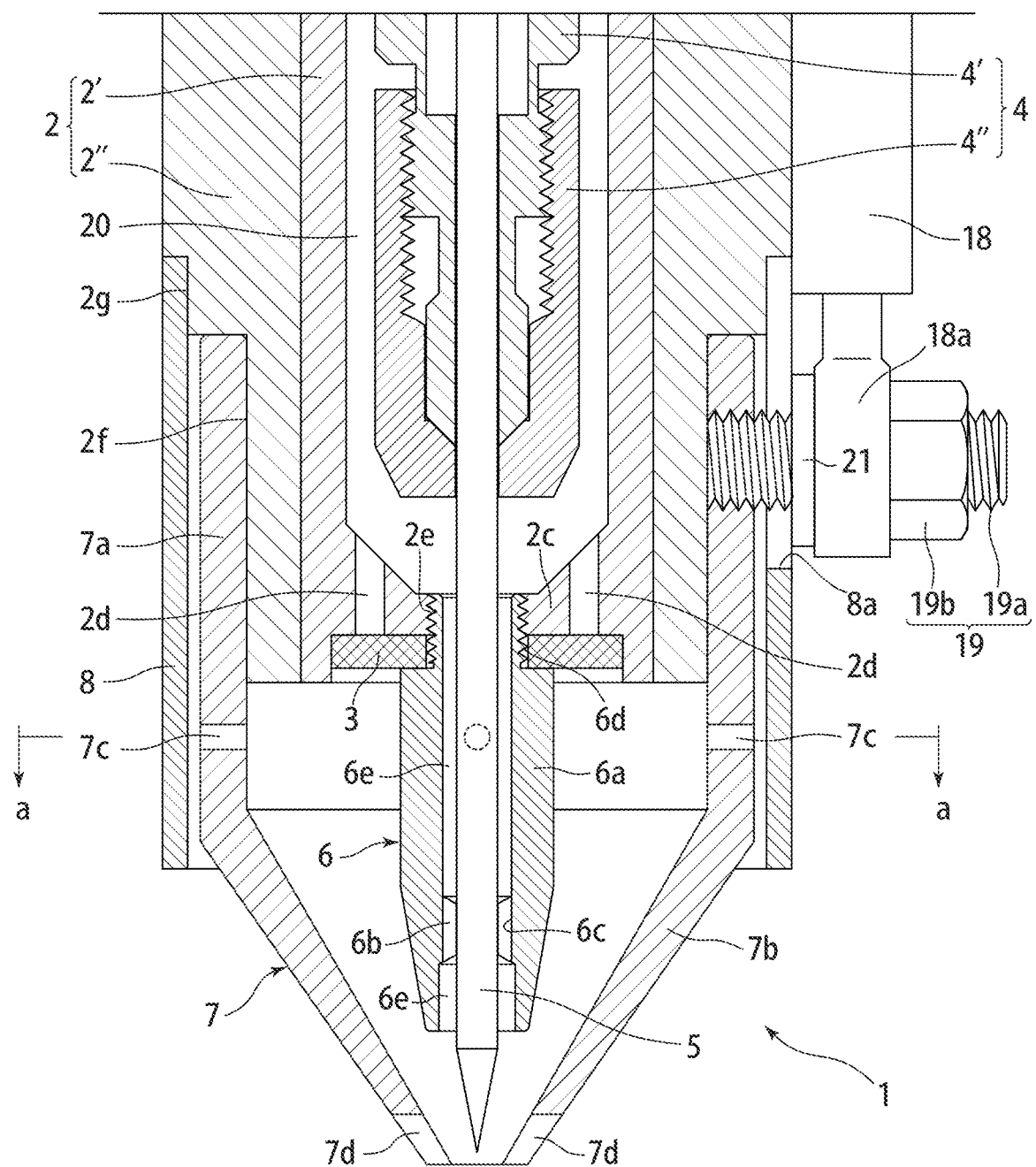
FIG. 3 is an enlarged longitudinal front view of the main part of the TIG welding torch with a constricted nozzle shown in FIG. 1.

Further, as shown in FIG. 3, a distal end wall 2c is integrally provided inside the distal end portion of the torch main body 2', i.e., inside the lower end portion of the torch main body 2' shown in FIG. 1. On the distal wall 2c, a plurality of discharge holes 2d is provided at equal angles along the circumferential direction for discharging the shielding gas G around the constricted nozzle 6 along the axial direction. Also, a female screw 2e is provided in the center portion of the distal end wall 2c for detachably screwing the constricted nozzle 6.

In addition, as shown in FIGS. 1 and 3, two-stage step portions 2f and 2g for fitting electrode nozzle 7 and the heat insulating cover 8 are provided on the outer peripheral surface of the distal end portion of the cylindrical insulator 2", i.e., the outer peripheral surface of the lower end portion of the cylindrical insulator 2" shown in FIG. 1. The electrode nozzle 7 is fitted to the stepped portion 2f of the small diameter, and the heat insulating cover 8 is fitted to the stepped portion 2g of the large diameter.

The gas lens 3 (filter) is made by laminating a plurality of wire mesh punched annularly and is fitted and fixed in contact with the outer surface of the distal end wall 2c inside the distal end portion of the torch main body 2'.

In the present embodiment, a superimposition of six to ten stainless steel wire gauze of several hundred meshes is used in the gas lens 3.

The electrode collet 4 is configured in an elongated cylindrical shape having a half-split shaped chuck portion at the distal end portion (the lower end portion of the electrode collet 4 shown in FIG. 1), and includes a copper-made collet main body 4' configured to have a male screw 4a provided on a part of the outer peripheral surface, with the male screw being screwed axially movable (vertically movable) in a female screw 2b provided on the proximal end portion side of the torch body 2, and a copper-made cylindrical fitting 4" detachably screwed on the outer peripheral surface of the chuck portion of the collet main body 4' for fixing the tungsten electrode rod 5 inserted into the collet main body 4' by tightening the chuck portion.

Further, the electrode collet 4 is screwed into the torch body 2 from the proximal end portion side, and is configured to move in the axial direction (the vertical direction in FIG. 1) within the torch body 2, by forward-reversely rotating the collet knob 15 fixed to the proximal end portion of the collet body 4' (the upper end portion of the collet body 4' shown in FIG. 1), so as to forward-reversely rotating the electrode collet 4.

Moreover, the electrode collet 4 is configured to define a cylindrical shielding gas passage 20 between the inner peripheral surface of the torch main body 2' and the outer peripheral surface of the electrode collet 4 by inserting the electrode collet 4 into the torch body 2, wherein the shielding gas G flowing into the torch body 2 from the cable connection fitting 10 flows through the shielding gas passage 20.

The constricted nozzle 6 is arranged on the outer circumference of the distal end portion of the tungsten electrode rod 5, and supports the tungsten electrode rod 5 concentrically in a state where the distal end of the tungsten electrode rod 5 protrudes. The constricted nozzle 6 is also configured to define an annular gas passage 6e between the tungsten electrode rod 5 and the constricted nozzle 6. The shielding gas G flowing through the torch main body 2' is discharged from the gas passage 6e to the distal end portion of the tungsten electrode rod 5 at a higher speed than the shielding gas G discharged from the discharge hole 2d of the torch main body 2' through the gas lens 3.

Figure 4:
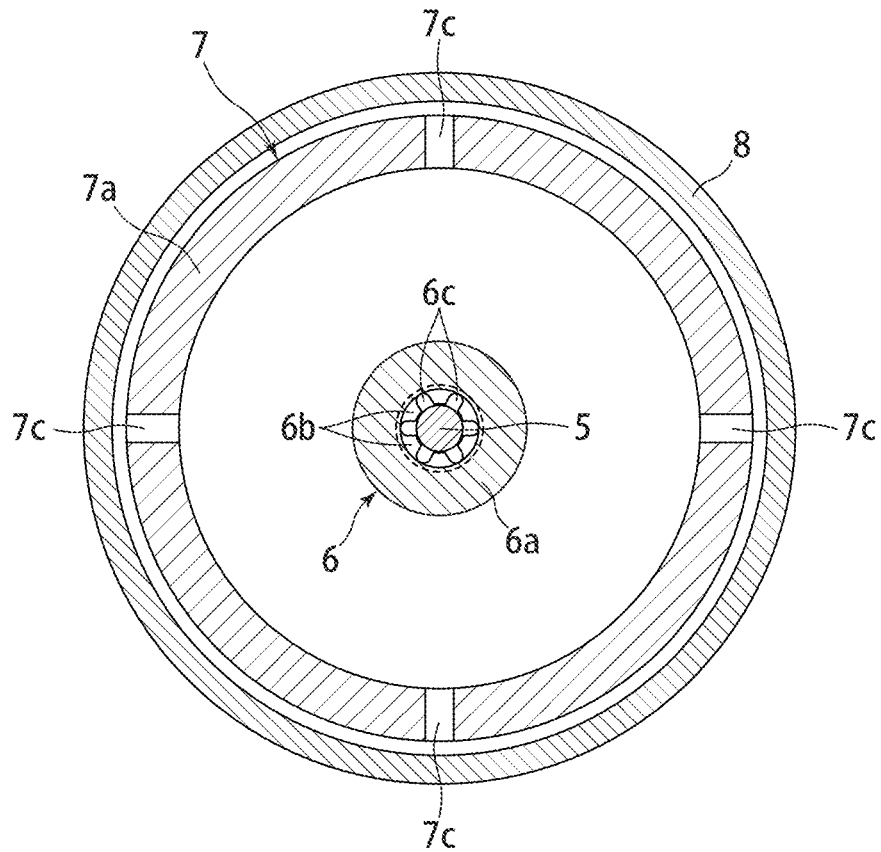
FIG. 4 is a sectional view taken along line a-a in FIG. 3.

That is, the constricted nozzle 6 is made of a copper material having excellent conductivity and strength (beryllium copper), and configured to have a cylindrical body. As shown in FIGS. 3 and 4, the constricted nozzle 6 is provided with a cylindrical nozzle main body 6a provided around the distal end portion of the tungsten electrode rod 5, concentrical with the tungsten electrode rod 5, for defining an annular gas passage 6e between the outer peripheral surface of the distal end portion of the tungsten electrode rod 5 and the cylindrical nozzle main body 6a. The constricted nozzle 6 is provided with a plurality of positioning ridges 6b protruding at a predetermined distance on the inner circumferential surface of the nozzle main body 6a, along the longitudinal direction of the nozzle body 6a, for holding the tungsten electrode rod 5 in the center position of the nozzle main body 6a. The constricted nozzle 6 is provided with a plurality of gas rectifying groove 6c provided between the plurality of positioning ridges 6b, extending parallel to the longitudinal direction of the nozzle main body 6a, for rectifying the shielding gas G flowing in the gas passage 6e. A male screw 6d provided on the outer peripheral surface of the proximal end portion of the nozzle main body 6a (the upper end portion of the nozzle body 6a shown in FIG. 3), detachably screwed to a female screw 2e provided at the center of the distal end wall 2C of the torch main body 2'.

In addition, the positioning ridges 6b and the gas rectifying grooves 6c are respectively provided at equal angles in the circumferential direction on the inner peripheral surface of the nozzle main body 6a, and configured to flow the shielding gas G from the distal end opening of the nozzle main body 6a evenly around the distal end portion of the tungsten electrode rod 5.

Further, the positioning ridges 6b and the gas rectifying grooves 6c are disposed at positions away from the distal end of the nozzle main body 6a. Moreover, the inner diameter of the gas passage 6e located downstream of the positioning ridge 6b and the gas rectifying groove 6c is configured larger than the inner diameter of the gas passage 6e located upstream of the positioning ridge 6b and the gas rectifying groove 6c. Consequently, the shielding gas G flowing into the gas passage 6e is rectified by passing through the gas rectifying groove 6c and is discharged from the distal end opening of the nozzle main body 6a after stabilizing at the downstream side portion of the gas passage 6e.

The electrode nozzle 7 is made of a metal material having conductivity, and configured in a cylindrical shape, with a tapered shape at the distal end portion.

Figure 5:
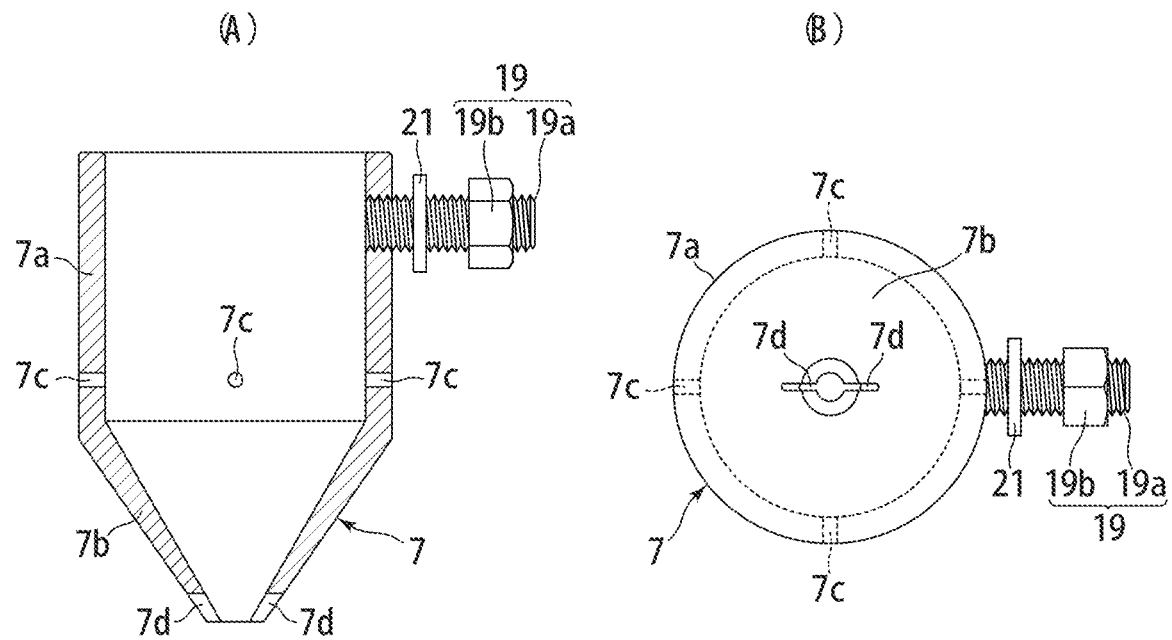
FIG. 5 shows an electrode nozzle used in the TIG welding torch with a constricted nozzle shown in FIG. 1, (A) is an enlarged longitudinal sectional view of the electrode nozzle, (B) is an enlarged bottom view of the electrode nozzle.

That is, the electrode nozzle 7, as shown in FIGS. 3 to 5, includes a cylindrical portion 7a connected to the terminal 18a of the ground cable 18 and attached in a fitting state to the outer peripheral surface of a stepped portion 2f of a small diameter, which is provided on the outer peripheral surface of the distal end portion of a cylindrical insulator 2" of the torch body 2, a cylindrical tapered portion 7b continuously provided to the cylindrical portion 7a and configured in a tapered shape toward the distal end portion side, a plurality of hole-shaped vent ports 7c provided at predetermined intervals in the circumferential direction in the cylindrical portion 7a for discharging the shielding gas G in the electrode nozzle 7, a plurality of slit-shaped and groove-shaped gas vent ports 7d provided at a predetermined distance in the circumferential direction at the distal end of the cylindrical tapered portion 7b for discharging the shielding gas G in the electrode nozzle 7, and a terminal fastener 19 provided at the proximal end portion of the cylindrical portion 7a for connecting the terminal 18a of the ground cable 18.

Further, the terminal fastener 19 includes a headless screw 19a screwed in the cylindrical portion 7a in a state of protruding outwardly and inserted into the terminal 18a of the ground cable 18, and a nut 19b screwed to the headless screw 19a. By inserting the headless screw 19a through the washer 21 into the terminal 18a of the ground cable 18 and screwing the nut 19b to the headless screw 19a, the terminal 18a of the ground cable 18 can be connected to the cylindrical portion 7a.

Then, when the electrode nozzle 7 is attached to the distal end portion of the torch body 2 in a fitting state, the electrode nozzle 7 is provided concentrically with the distal end portion of the tungsten electrode rod 5 protruding from the distal end portion of the constricted nozzle 6, and the distal end of the electrode nozzle 7 is located outward from the distal end of the tungsten electrode rod 5. Therefore, the distal end portions of the constricted nozzle 6 and the tungsten electrode rod 5 are covered with the electrode nozzle 7.

In the present embodiment, the electrode nozzle 7 is made of oxygen-free copper having conductivity, and four hole-shaped gas vent ports are formed in every 90 degrees along the circumferential direction in the cylindrical portion 7a. In addition, the nozzle diameter (the inner diameter of the distal end opening of the cylindrical tapered portion 7b) of the electrode nozzle 7 is set to 2 mm, the distance between the distal end surface of the electrode nozzle 7 and the distal end of the tungsten electrode rod 5 is set to 0.5 mm, and the outer diameter of the cylindrical portion 7a of the electrode nozzle 7 is set to 1 mm smaller than the outer diameter of the step portion 2g having a large diameter, which is provided on the outer peripheral surface of the distal end of the cylindrical insulator 2", respectively. Furthermore, two slit-shaped and groove-shaped gas vent ports 7d are provided at 180-degree intervals along the circumferential direction in the distal end of the cylindrical tapered portion 7b of the electrode nozzle 7. Therefore, the two slit-shaped and groove-shaped gas vent ports 7d are provided in a straight line along the diameter direction in the distal end of the electrode nozzle 7. In addition, the width of the slit-shaped and groove-shaped gas vent ports 7d is set to 0.5 mm, and the depth of the slit-shaped and groove-shaped gas vent ports 7d is set to 2 mm, respectively.

In addition, the number of the hole-shaped vent ports 7c and the number of the slit-shaped and groove-shaped gas vent ports 7d, etc., are set such as to be able to discharge the shielding gas G in the electrode nozzle 7 and prevent turbulence of the shielding gas G in the electrode nozzle 7, as well as discharge the metal vapor M in the electrode nozzle 7 to the outside satisfactorily and reliably.

Further, the slit width of the slit-shaped and groove-shaped gas vent ports 7d and the nozzle diameter (inner diameter of the distal end opening of the cylindrical tapered portion 7b) of the electrode nozzle 7 are determined in accordance with the welding current. By changing the welding current, the slit width of the slit-shaped and groove-shaped gas vent ports 7d, and the nozzle diameter of the electrode nozzle 7, the size of the molten pool (outer diameter) becomes adjustable.

Table 1 below represents sizes of the molten pool (outer diameter) by changing the welding current, the slit width of the slit-shaped and groove-shaped gas vent ports 7d, and the nozzle diameter of the electrode nozzle 7 respectively, when spot welding is performed by the TIG welding torch 1 with a constricted nozzle using the electrode nozzle 7 shown in FIG. 5. At this time, the molten pool becomes an elliptical-shaped molten pool by the slit-shaped and groove-shaped gas vent ports 7d, so the major axis side of the molten pool is along with the slit-shaped groove-shaped gas vent ports 7d. Incidentally, the outer diameters of the molten pool indicate the dimensions of the major axis side.

TABLE 1

| Welding current (A) | 5~30 | 20~80 | 50~120 | 100~200 |
| --- | --- | --- | --- | --- |
| Slit width of slit-shaped gas vent port in (mm) | 0.3 | 0.5 | 1.0 | 1.0 |
| Nozzle diameter of the electrode nozzle (mm) | 0.6 | 1.0 | 2.0 | 3.0 |
| Diameter of the major axis side of the molten pool (mm) | 0.2~0.4 | 0.4~0.7 | 0.7~1.5 | 1.5~2.5 |

The heat-insulating cover 8 is made of a metallic material, configured in a cylindrical shape larger than the outer diameter of the cylindrical portion 7a of the electrode nozzle 7, and attached in a fitted state to the outer peripheral surface of the stepped portion 2g, which has a large diameter and provided in the distal end portion of the cylindrical insulator 2" of the torch body 2. At this time, between the heat insulating cover 8 and the electrode nozzle 7, an annular cooling passage is defined for flowing the shielding gas G discharged from the plurality of hole-shaped vent ports 7c.

Figure 2:
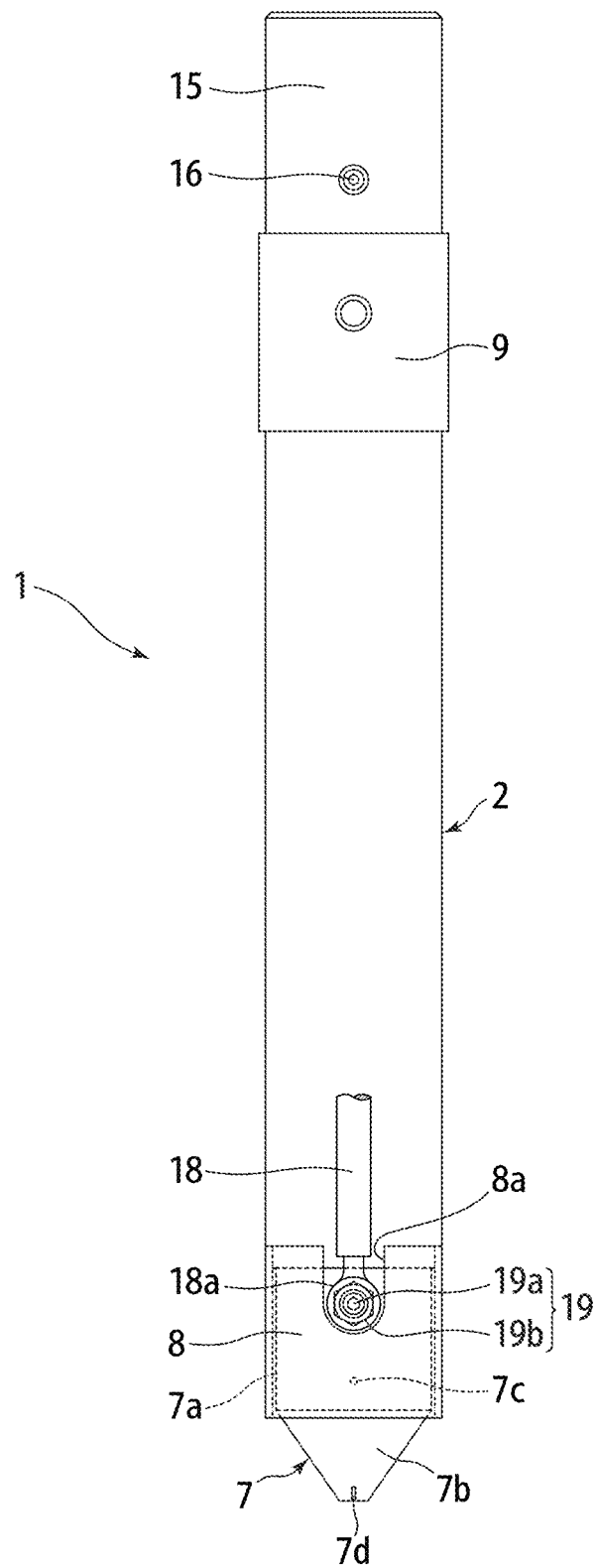
FIG. 2 is a side view of the TIG welding torch with a constricted nozzle shown in FIG. 1.

Further, when the heat insulating cover 8 is attached to the distal end portion of the torch body 2, a U-shaped notch 8a for inserting the headless screw 19a screwed to the electrode nozzle 7 is provided on the proximal end portion of the heat insulating cover 8 (the upper end portion of the heat insulating cover 8 shown in FIG. 2).

In the present embodiment, the heat insulating cover 8 is made of aluminum material, configured in a cylindrical shape having an inner diameter that is only 1 mm larger than the outer diameter of the cylindrical portion 7a of the electrode nozzle 7, and the gap of the annular cooling passage defined between the heat insulating cover 8 and the cylindrical portion 7a of the electrode nozzle 7 is set to 0.5 mm.

Figure 6:
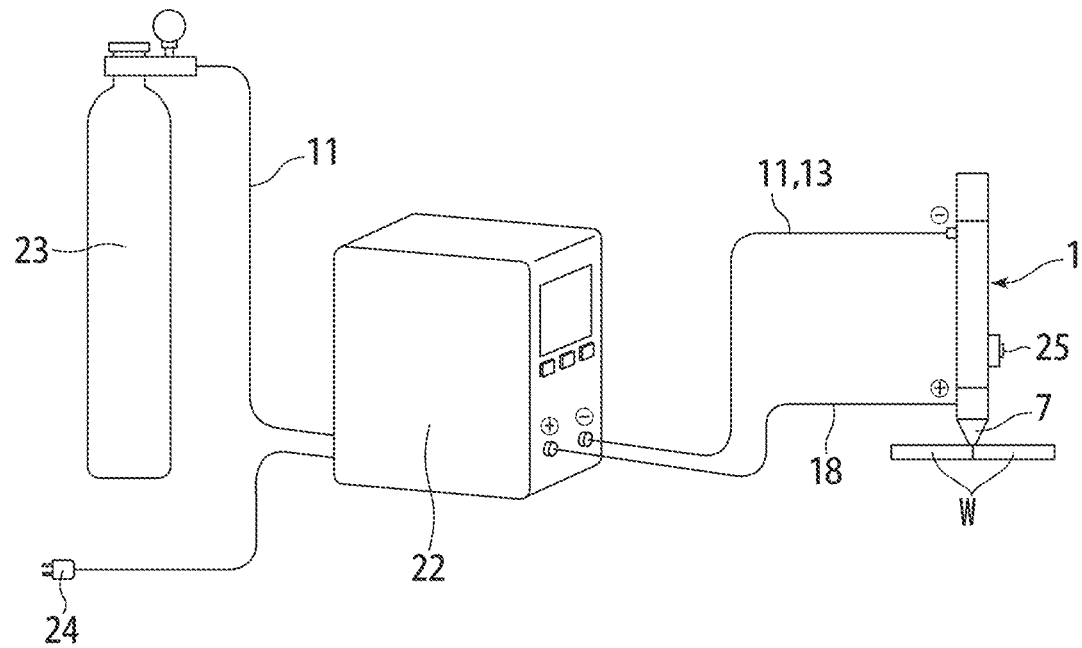
FIG. 6 shows a TIG welding apparatus using the TIG welding torch with a constricted nozzle, (A) is a schematic description view of a TIG welding apparatus in which a tungsten electrode rod of the TIG welding torch with a constricted nozzle is a cathode and the electrode nozzle is an anode, (B) is a schematic description view of a TIG welding apparatus in which a tungsten electrode rod of the TIG welding torch with a constricted nozzle is a cathode and a metal plate (base material) is an anode.
Figure 6:
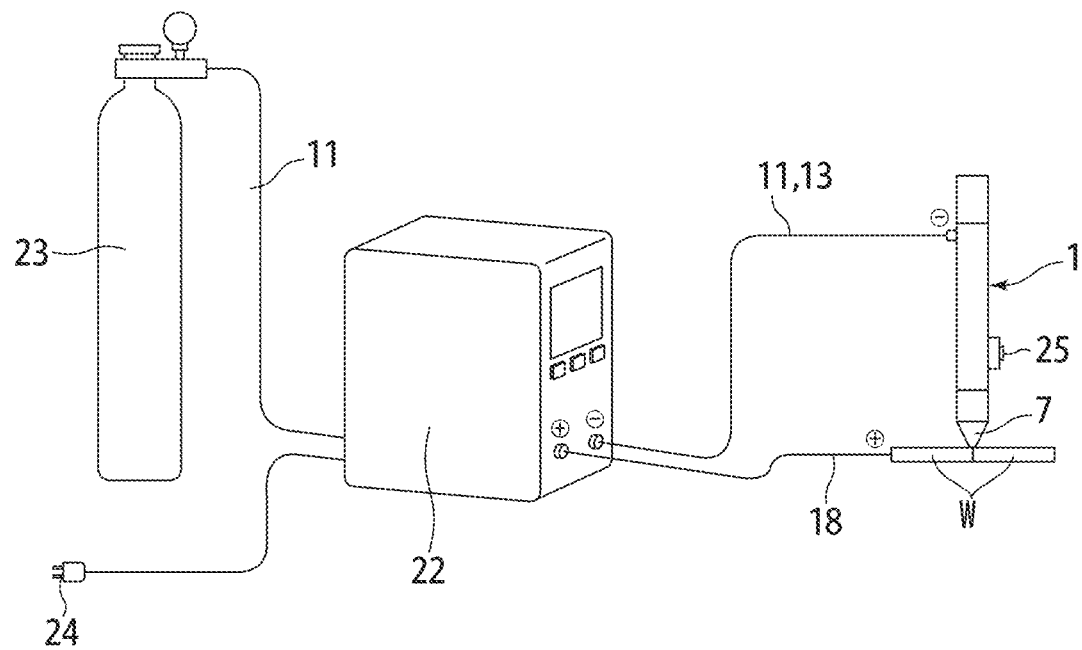

FIG. 6 shows a schematic explanatory view of a TIG welding apparatus using a TIG welding torch 1 with a constricted nozzle for spot welding described above. The TIG welding apparatus includes a box-shaped power control unit 22 with a built-in welding power supply circuit and a built-in control circuit and switches such as a touch panel and a power switch on the front surface, a gas cylinder 23, which is the supply source of the shielding gas G, connected via a gas hose 11 to the power control unit 22, a TIG welding torch 1 with a constricted nozzle for performing spot welding on a base material W, that is connected to the power supply control unit 22 via the gas hose 11, a torch cable 13 and a ground cable 18, and an outlet 24 provided to the power control unit 22 and connected to the power supply.

At this time, in the TIG welding torch 1 with a constricted nozzle, as shown in FIG. 6(A), the tungsten electrode rod 5 may be connected to the cathode terminal of the power supply control unit 22 via the torch cable 13, and the electrode nozzle 7 may be connected to the anode terminal of the power supply control unit 22 via the ground cable 18, or, as shown in FIG. 6(B), the tungsten electrode rod 5 may be connected to the cathode terminal of the power supply control unit 22 via the torch cable 13, the base material W (or both the base material W and the electrode nozzle 7) may be connected to the anode terminal of the power supply control unit 22 via the ground cable 18.

In addition, on the outer peripheral surface of the torch body 2 of the TIG welding torch 1 with a constricted nozzle, as shown in FIG. 6, a torch switch 25 is provided. The torch switch 25 is connected to the power control unit 22 via a switch cable (not shown).

Further, the power supply control unit 22 controls so as to supply the shielding gas G to the TIG welding torch 1 with a constricted nozzle according to the operation of the torch switch 25, and generate an arc a (arc plasma) by applying a voltage for a predetermined time after the flow of the shielding gas G is stabilized. Moreover, the current value and time at the time of spot welding are determined by the quality and the plate thickness of the base material W.

Figure 7:
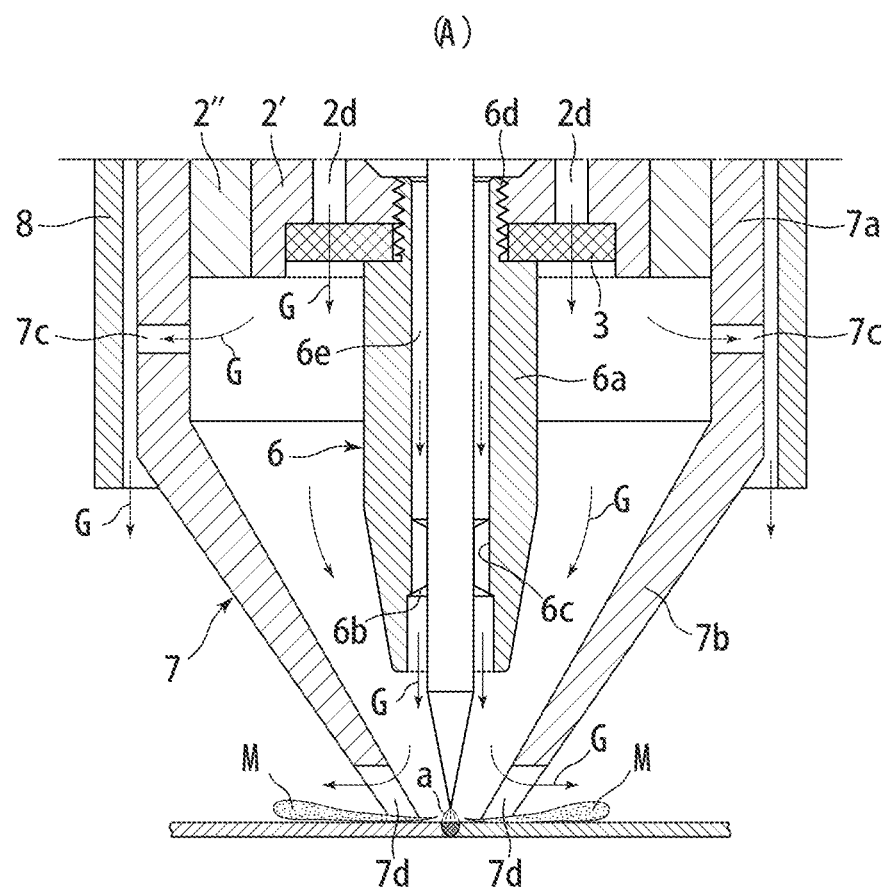
FIG. 7 shows a flow of the shielding gas at the distal end portion of a TIG welding torch with a constricted nozzle, (A) is an enlarged longitudinal front view of the main part of a TIG welding torch with a constricted nozzle, and (B) is a plan view of a spot-welded metal plate (base metal).
Figure 7:
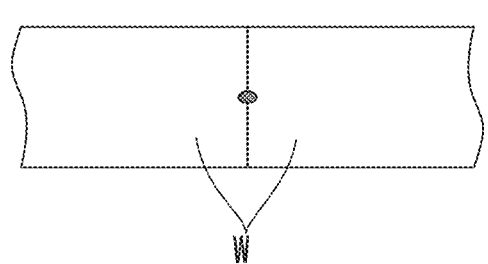

Thus, when spot welding on the base material W using the TIG welding torch 1 with a constricted nozzle described above, as shown in FIG. 7(A), the distal end surface of the electrode nozzle 7 is brought into contact with the spot for spot welding on the base material W in a surface contact state.

At this time, welding conditions such as welding current, flow rate of the shielding gas G, type of the shielding gas G, welding time, etc. are set under optimum conditions in accordance with the quality and the plate thickness of the base material W. Further, the tungsten electrode rod 5 is the cathode, and the electrode nozzle 7 is the anode. Therefore, the location where the electrode nozzle 7 and the base material W are in contact is the ground.

When the electrode nozzle 7 is brought into contact with the base material W, the torch switch 25 is pressed. Then, the shielding gas G is supplied to the TIG welding torch 1 with a constricted nozzle, and a voltage is applied between the tungsten electrode rod 5 and the base material W after the flow of the shielding gas G is stabilized. Then, arc a (arc plasma) is generated for a predetermined time between the distal end of the tungsten electrode rod 5 and the base material W in an atmosphere of the shielding gas G. Thus, a part of the base material W is melted, and spot welding is performed on the base material W.

The shielding gas G supplied to the torch body 2 flows down in the shielding gas passage 20, a part of which flows into the gas passage 6e of the constricted nozzle 6, and the remaining gas flows into the plurality of discharge holes 2d of the torch body 2.

The shielding gas G flowing into the gas passage 6e becomes a high-speed gas by increasing its speed, and is rectified by passing through a plurality of gas rectifying grooves 6c and becomes a high-speed rectifying gas, to be discharged in a straight line around the arc a from the distal end opening of the nozzle body 6a.

On the other hand, the shielding gas G flowing into the plurality of discharge holes 2d of the torch body 2 is discharged from the discharge holes 2d, uniformly diffused through the gas lens 3, and flows into space in the electrode nozzle 7. Thereafter, a part of the shielding gas G is discharged from the hole-shaped gas vent ports 7c provided in the cylindrical portion 7a of the electrode nozzle 7. At the same time, the remaining shielding gas G flows around the distal end portion of the tungsten electrode rod 5, and is discharged to the outside from the slit-shaped and groove-shaped gas vent ports 7d provided in the distal end of the cylindrical tapered portion 7b of the electrode nozzle 7, together with the shielding gas G discharged from the gas passage 6e of the constricted nozzle 6.

In addition, the shielding gas G discharged from the hole-shaped gas vent ports 7c provided in the cylindrical portion 7a of the electrode nozzle 7, after flowing through the cooling passage defined between the cylindrical portion 7a of the electrode nozzle 7 and the heat insulating cover 8, and cooling the electrode nozzle 7, is discharged to the outside from the end opening of the cooling passage.

In the TIG welding torch 1 with a constricted nozzle described above, while the tungsten electrode rod 5 is a cathode, the electrode nozzle 7 is an anode. Therefore, it is possible to perform spot welding (tack welding) in a state where the tapered-shape distal end of the electrode nozzle 7 is brought into contact with the base material W. Further, it is possible to easily set the target position of the spot welding.

Further, Using the TIG welding torch 1 with a constricted nozzle, since the distance between the distal end of the tungsten electrode rod 5 and the distal end of the electrode nozzle 7 is constant, it is possible to keep the length of the arc a constant.

Moreover, in the TIG welding torch 1 with a constricted nozzle, the distal end of the tungsten electrode rod 5 is covered with the electrode nozzle 7. Therefore, it is possible to eliminate the short-circuit phenomenon between the tungsten electrode rod 5 and the base material W, and avoid the arc "a" and the shielding gas G being affected by wind during welding. In addition, the leakage of the arc light to the outside can be minimized, and the welding operation can be performed safely without the operator looking directly at the intense light of the arc "a" or exposing their eyes or skin to harmful ultraviolet rays and infrared rays. Moreover, since the shielding gas G flows into the electrode nozzle 7, oxidation of the tungsten electrode rod 5 by oxygen can be prevented.

Furthermore, the TIG welding torch 1 with a constricted nozzle is provided with a constricted nozzle 6 for supporting the tungsten electrode rod 5 concentrically and flowing the shielding gas G around the tungsten electrode rod 5 at a high speed. Therefore, it is possible to accurately and reliably set the tungsten electrode rod 5 at a predetermined position when replacing the tungsten electrode rod 5.

Furthermore, the TIG welding torch 1 with a constricted nozzle is provided with hole-shaped vent ports 7c and slit-shaped and groove-shaped vent ports 7d in the electrode nozzle 7 for discharging the shielding gas G in the electrode nozzle 7 to the outside. Therefore, it is possible to prevent gas turbulence in the electrode nozzle 7 and to discharge the metal vapor M generated by the molten pool together with the shielding gas G from the slit-shaped and groove-shaped gas vent ports 7d to the outside. As a result, the TIG welding torch 1 with the constricted nozzle can prevent readhesion and contamination of the metal vapor M to the molten metal, thereby performing high-quality spot welding. Further, adhering of the metal vapor M to the distal end portion of the tungsten electrode rod 5 can be prevented, and the life of the tungsten electrode rod 5 can be prolonged.

Thus, since the above-described TIG welding torch 1 with a constricted nozzle can achieve the above-described function effect, even beginners can easily learn the art and easily perform good spot welding (temporary welding), and workability improvement, welding quality improvement, and productivity improvement can be achieved.

Figure 8:
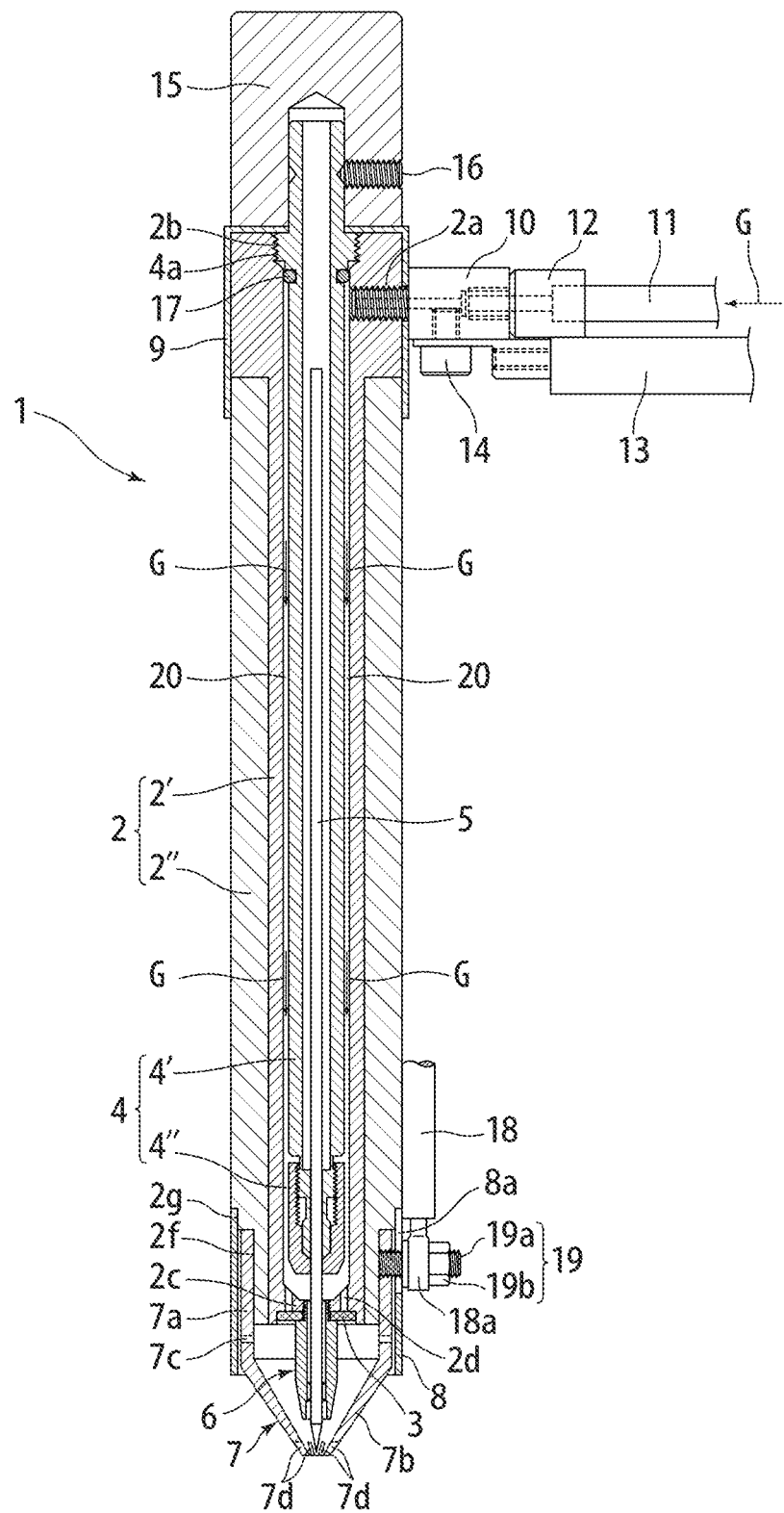
FIG. 8 is a longitudinal sectional front view of the TIG welding torch with a constricted nozzle for spot welding according to a second embodiment of the present invention.
Figure 9:
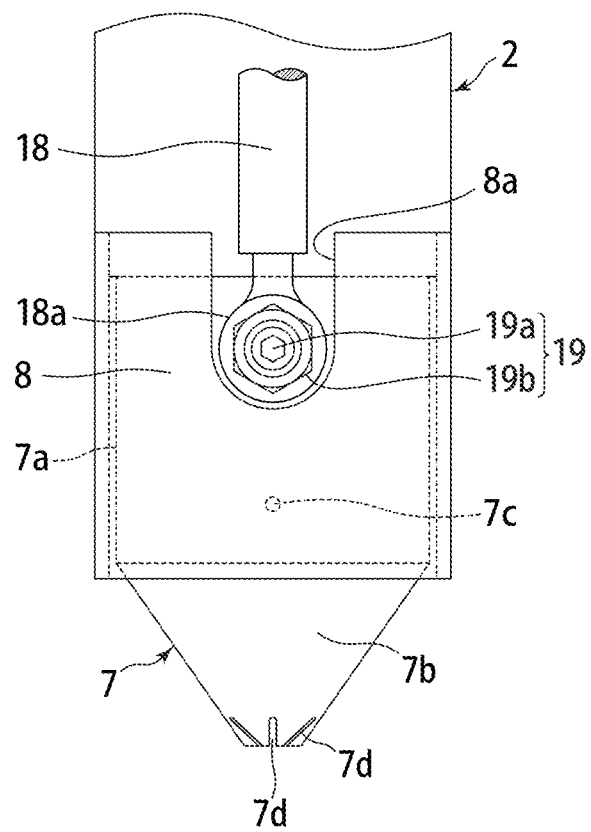
FIG. 9 is an enlarged side view of the main part of the TIG welding torch with a constricted nozzle shown in FIG. 8.
Figure 10:
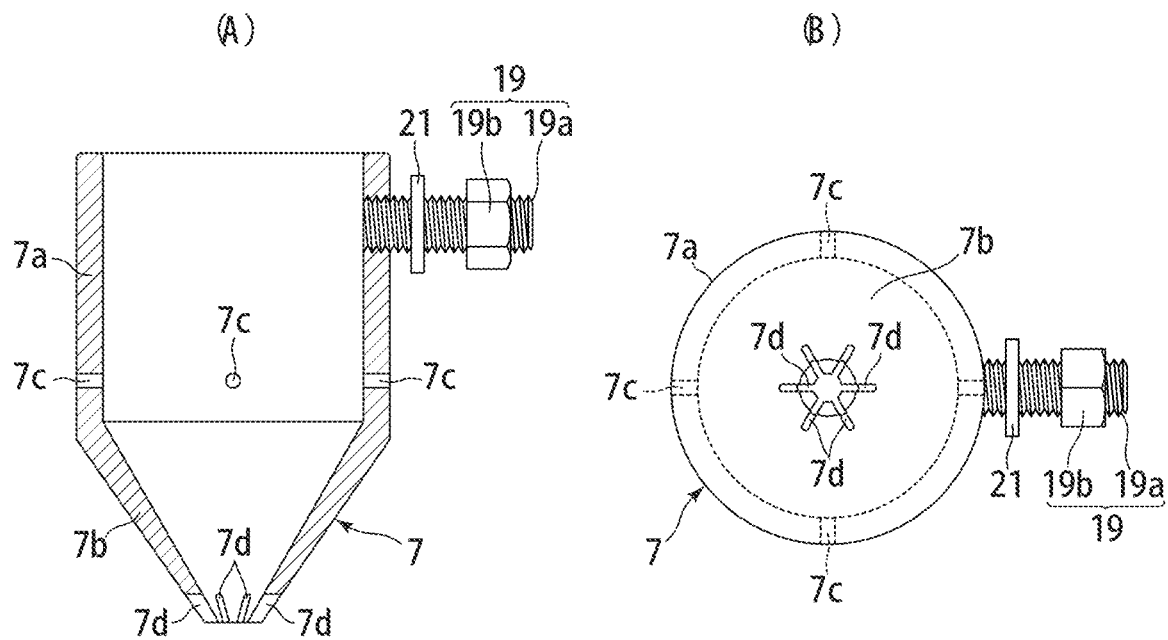
FIG. 10 shows an electrode nozzle used in the TIG welding torch with a constricted nozzle shown in FIG. 8, (A) is an enlarged longitudinal sectional view of the electrode nozzle, and (B) is an enlarged bottom view of the electrode nozzle.

FIGS. 8 to 10 show a TIG welding torch 1 with a constricted nozzle for spot welding according to the second embodiment of the present invention. In the TIG welding torch 1 with the constricted nozzle, the number of slit-shaped and groove-shaped vent ports 7d of the electrode nozzle 7 is changed. The torch body 2, the gas lens 3, the electrode collet 4, the tungsten electrode rod 5, the constricted nozzle 6, and the heat insulating cover 8 are configured to have the same shape and the same structure as the respective members of the TIG welding torch 1 with a constricted nozzle shown in FIGS. 1 to 5. The same parts and members as those of the TIG welding torch 1 with a constricted nozzle shown in FIGS. 1 to 5 are denoted by the same reference numerals, and detailed descriptions thereof are omitted.

The electrode nozzle 7 is made of a metal material having conductivity and is configured in a cylindrical shape with the distal end portion formed in a tapered shape. The electrode nozzle 7 includes a cylindrical portion 7a attached in a fitted state to the outer peripheral surface of the stepped portion 2f of the small diameter provided on the outer peripheral surface of the distal end portion of the cylindrical insulator 2" of the torch body 2, and connected to the terminal 18a of the ground cable 18, a cylindrical tapered portion 7b continuously provided with the cylindrical portion 7a and formed in a tapered shape toward the distal end portion side, a plurality of hole-shaped vent ports 7c provided at predetermined intervals in the circumferential direction in the cylindrical portion 7a, for discharging the shielding gas G in the electrode nozzle 7 to the outside, a plurality of slit-shaped and groove-shaped gas vents 7d provided at predetermined intervals in the circumferential direction on the distal end of the cylindrical tapered portion 7b, for discharging the shielding gas G in the electrode nozzle 7 to the outside, and a terminal fastener 19 provided in the proximal end portion of the cylindrical portion 7a, for connecting the terminal 18a of the ground cable 18.

In the present embodiment, the electrode nozzle 7 is made of oxygen-free copper having conductivity, four hole-shaped vent ports 7c are provided every 90 degrees along the circumferential direction in the cylindrical portion 7a. Further, the nozzle diameter of the electrode nozzle 7 (the inner diameter of the distal end opening of the cylindrical tapered portion 7b) is set to 2 mm, the distance between the distal end surface of the electrode nozzle 7 and the distal end of the tungsten electrode rod 5 is set to 0.5 mm, the outer diameter of the cylindrical portion 7a of the electrode nozzle 7 is set to 1 mm smaller than the outer diameter of the stepped portion 2g of the large diameter formed on the outer peripheral surface of the distal end of the cylindrical insulator 2", respectively. Furthermore, on the distal end of the cylindrical tapered portion 7b of the electrode nozzle 7, six slit-shaped and groove-shaped gas vent ports 7d are provided at 60-degree intervals along the circumferential direction. Therefore, the six slit-shaped and groove-shaped vent ports 7d are provided radially at the distal end of the electrode nozzle 7. In addition, the width of the slit-shaped and groove-shaped gas vent ports 7d is set to 0.5 mm, and the depth of the slit-shaped and groove-shaped gas vent ports 7d is set to 2 mm, respectively.

The TIG welding torch 1 with a constricted nozzle for spot welding shown in FIGS. 8 to 10 may have the same function effect as the TIG welding torch 1 with a constricted nozzle shown in FIGS. 1 to 5.

Figure 11:
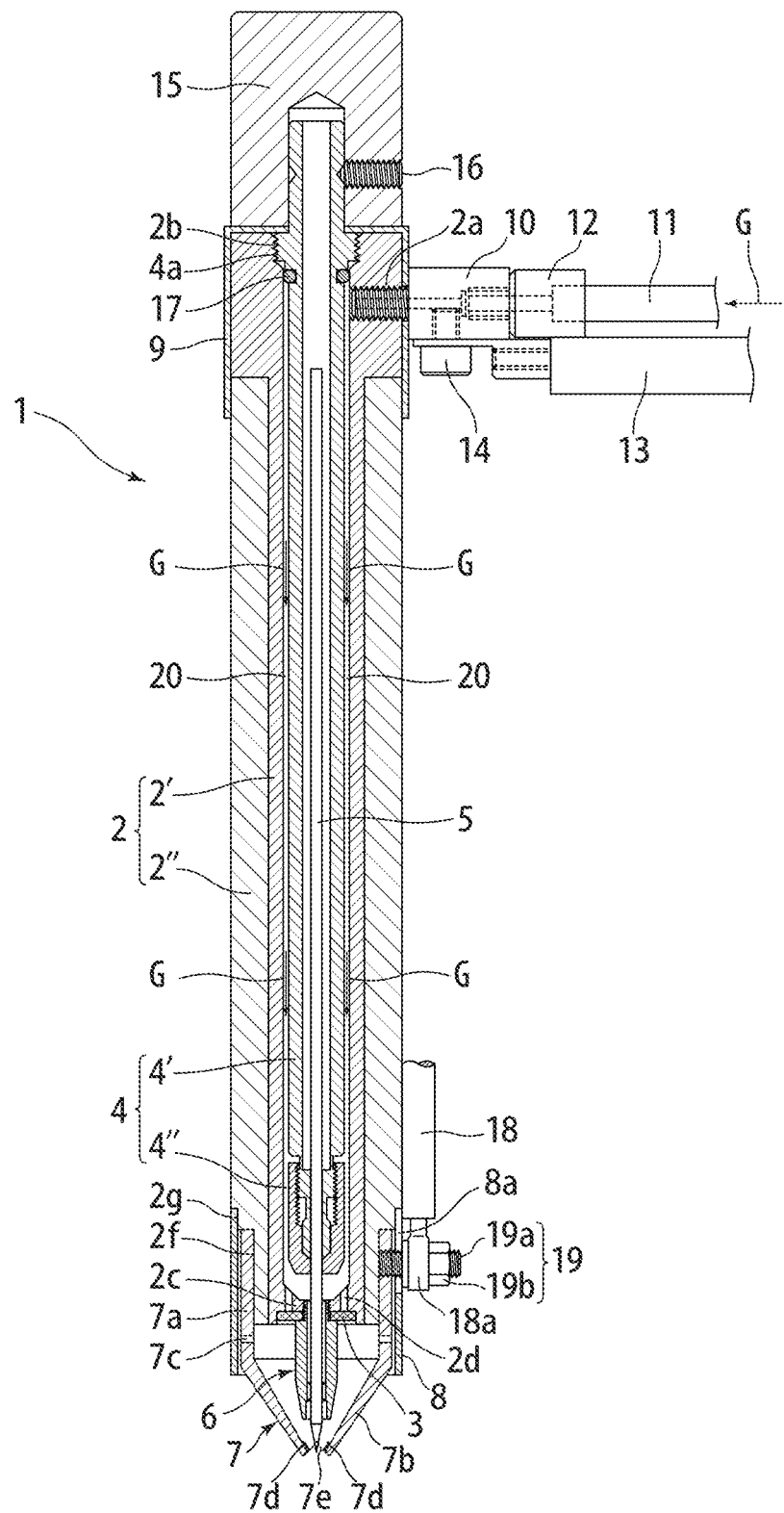
FIG. 11 is a longitudinal front view of a TIG welding torch with a constricted nozzle for spot welding according to a third embodiment of the present invention.
Figure 12:
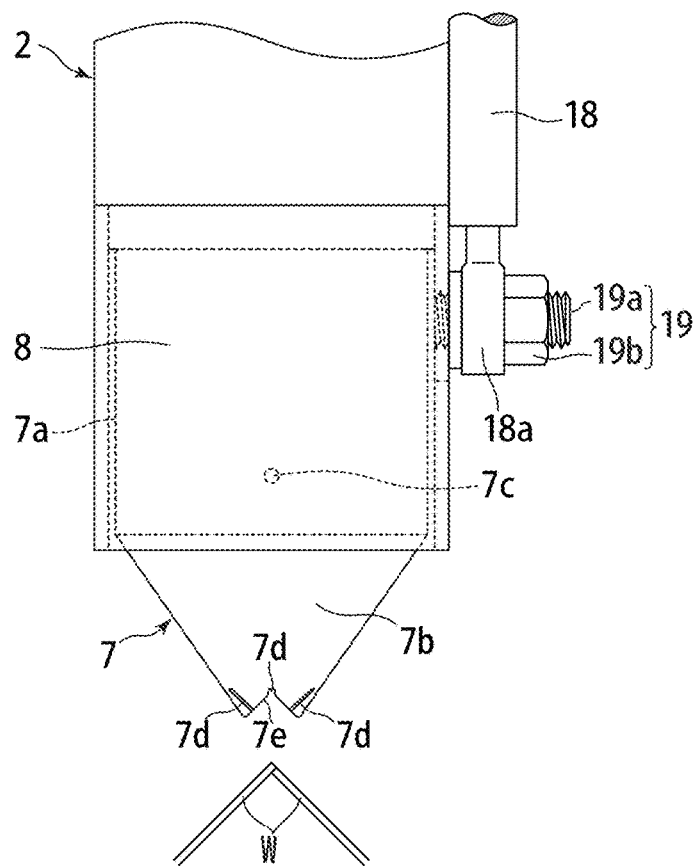
FIG. 12 is an enlarged side view of the main part of the TIG welding torch with a constricted nozzle shown in FIG. 11.
Figure 13:
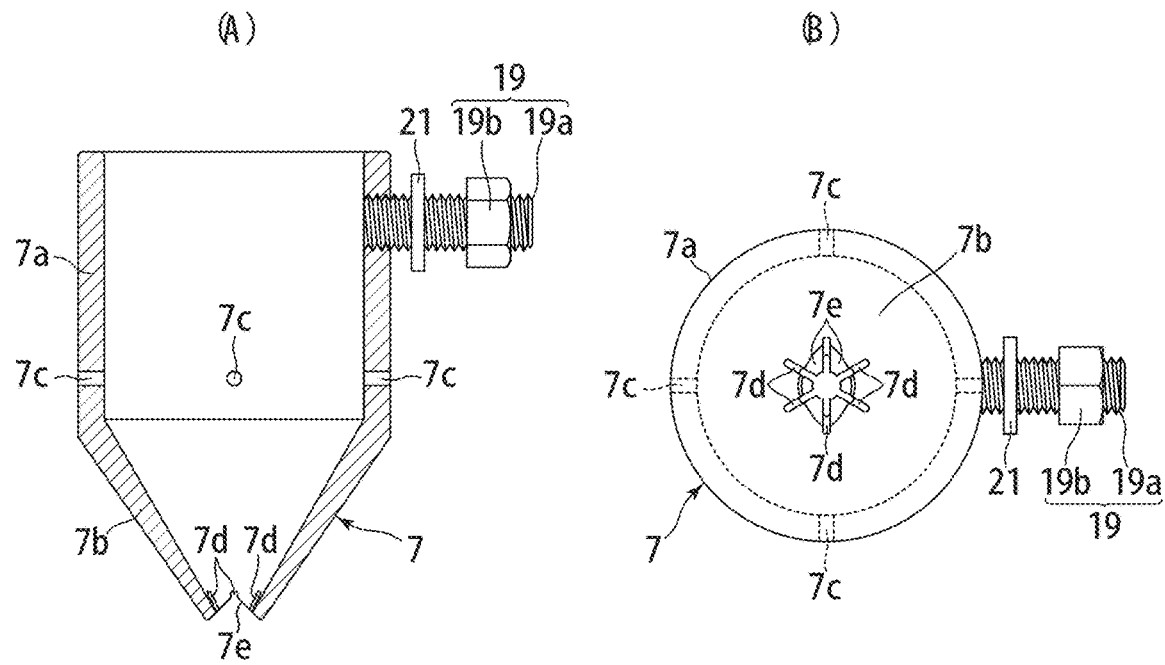
FIG. 13 shows an electrode nozzle used in the TIG welding torch with a constricted nozzle shown in FIG. 11, (A) is an enlarged longitudinal sectional view of the electrode nozzle, and (B) is an enlarged bottom view of the electrode nozzle.

FIGS. 11 to 13 show the TIG welding torch 1 with a constricted nozzle for spot welding according to the third embodiment of the present invention. The TIG welding torch 1 with a constricted nozzle has a different structure at the distal end of the electrode nozzle 7. The torch body 2, the gas lens 3, the electrode collet 4, the tungsten electrode rod 5, the constricted nozzle 6, the heat insulating cover 8, and the like are configured to have the same shape and the same structure as the respective members of the TIG welding torch 1 with a constricted nozzle shown in FIGS. 1 to 5. The same parts and members as those of the TIG welding torch 1 with a constricted nozzle shown in FIGS. 1 to 5 are denoted by the same reference numerals, and detailed descriptions thereof are omitted.

The electrode nozzle 7 includes a cylindrical portion 7a made of a metal material having conductivity and configured to have a tapered cylindrical shape at the distal end portion, wherein the cylindrical portion 7a is attached in a fitted state to an outer peripheral surface of the stepped portion with a small-diameter side configured on the outer peripheral surface of the distal end portion of the cylindrical insulator 2" of the torch body 2, and connected to a terminal 18a of a ground cable 18, a cylindrical tapered portion 7b continuously provided to the cylindrical portion 7a and formed in a tapered shape toward the distal end portion side, a plurality of hole-shaped gas vent ports 7c provided at predetermined intervals circumferentially in the cylindrical portion 7a for discharging the shielding gas G in the electrode nozzle 7 to the outside, a plurality of slit-shaped and groove-shaped gas vent ports 7d provided at predetermined intervals circumferentially in the distal end of the cylindrical tapered portion 7b for discharging the shielding gas G in the electrode nozzle 7 to the outside, a V-shaped positioning groove 7e provided at the distal end of the cylindrical tapered portion 7b to be fitted in the corner of the corner joint, a terminal fastener 19 provided at the proximal end of the cylindrical portion 7a for connecting the terminal 18a of the ground cable 18 to the cylindrical portion 7a.

In the present embodiment, the electrode nozzle 7 is made of oxygen-free copper having conductivity, and four hole-shaped gas vent ports 7c are provided every 90 degrees along the circumferential direction on the cylindrical portion 7a. Moreover, the nozzle diameter of the electrode nozzle 7 (the inner diameter of the distal end opening of the cylindrical tapered portion 7b) is set to 2 mm, the distance between the distal end surface of the electrode nozzle 7 and the distal end of the tungsten electrode rod 5 is set to 0.5 mm, the outer diameter of the cylindrical portion 7a of the electrode nozzle 7 is set to 1 mm smaller than the outer diameter of the stepped portion 2g with a large diameter formed on the outer peripheral surface of the distal end portion of the cylindrical insulator 2". Furthermore, on the distal end of the cylindrical tapered portion 7b of the electrode nozzle 7, six slit-shaped and groove-shaped gas vent ports 7d are provided at 60-degree intervals along the circumferential direction. Therefore, the six slit-shaped and groove-shaped vent ports 7d are provided radially at the distal end of the electrode nozzle 7. In addition, the width of the slit-shaped and groove-shaped gas vent ports 7d is set to 0.5 mm, the depth of the slit-shaped and groove-shaped gas vent ports 7d is set to 2 mm, and the angle of the opposing surface of the V-shaped positioning groove 7e is set to 90 degrees, respectively. Further, the depth of the V-shaped positioning groove 7e is set to be shallower than the depth of the groove-shaped gas vent ports 7d.

The TIG welding torch 1 with a constricted nozzle for spot welding shown in FIGS. 11 to 13 may have the same function effect as the TIG welding torch 1 with a constricted nozzle shown in FIGS. 8 to 10. Moreover, in the TIG welding torch 1 with a constricted nozzle shown in FIGS. 11 to 13, by disposing a V-shaped positioning groove 7e fitted to the corner of the corner joint at the distal end of the cylindrical tapered portion 7b of the electrode nozzle 7, when performing spot welding on the corner joint, the target spot of the spot welding (temporary welding) can be reliably and easily set.

Figure 14:
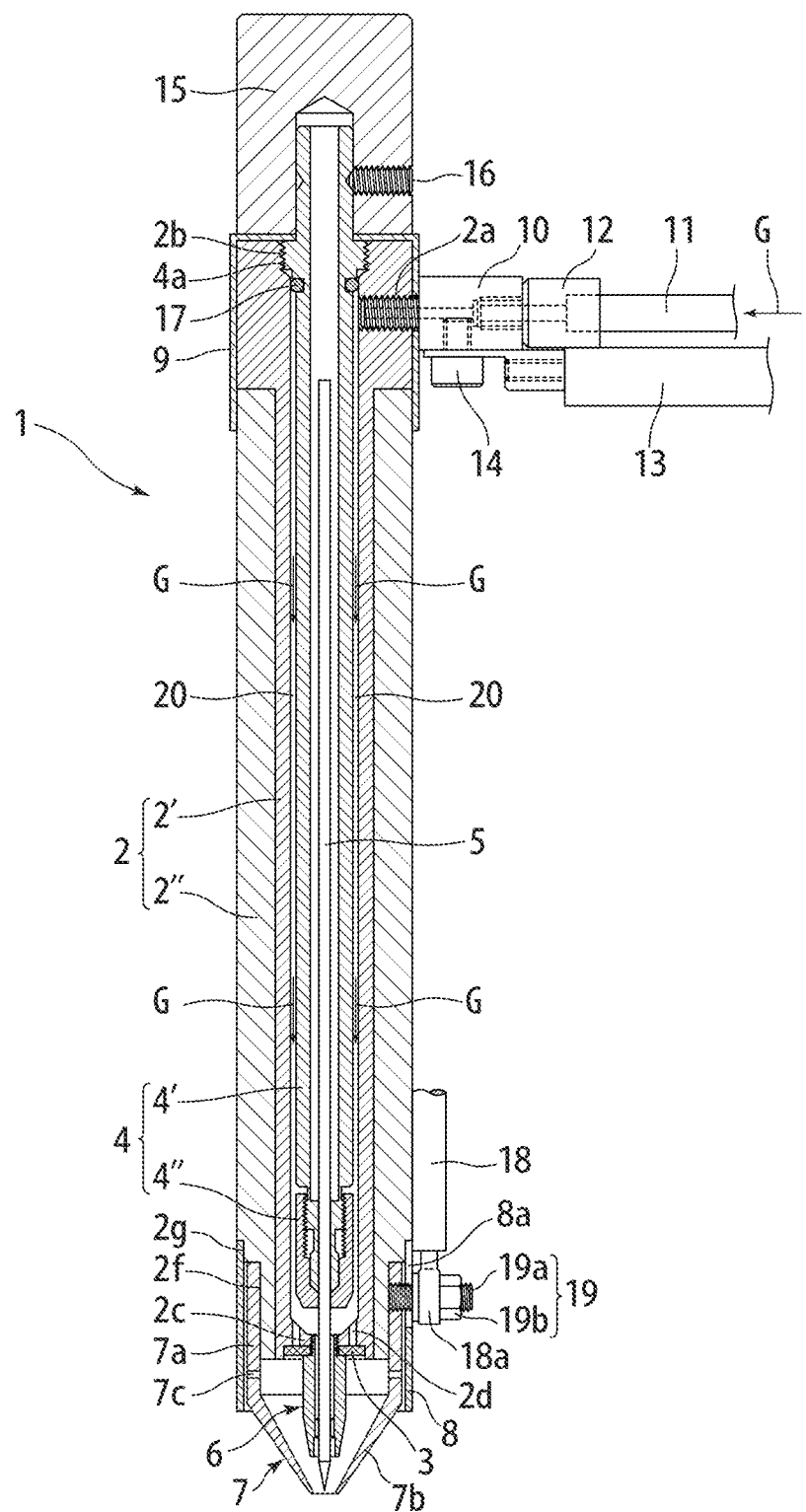
FIG. 14 is a longitudinal sectional front view of the TIG welding torch with a constricted nozzle for spot welding according to a fourth embodiment of the present invention.
Figure 15:
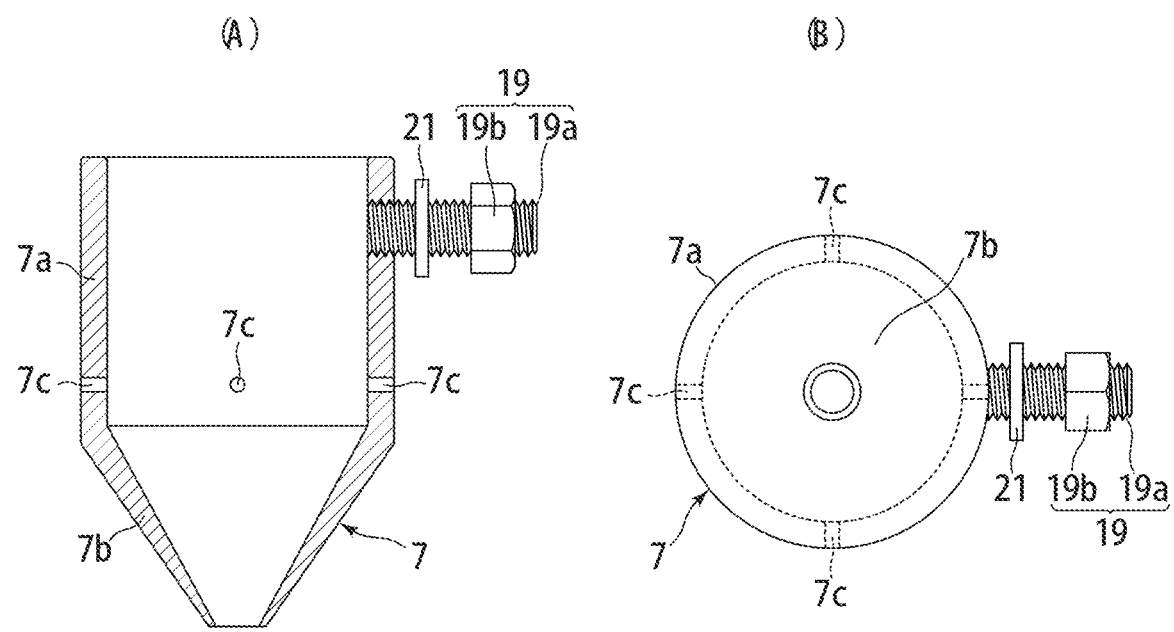
FIG. 15 shows an electrode nozzle used in the TIG welding torch with a constricted nozzle shown in FIG. 14, (A) is an enlarged longitudinal sectional view of the electrode nozzle, (B) is an enlarged bottom view of the electrode nozzle.

FIGS. 14 and 15 show the TIG welding torch 1 with a constricted nozzle for spot welding according to the fourth embodiment of the present invention. The TIG welding torch 1 with a constricted nozzle has a different structure of the distal end of the electrode nozzle 7. The torch body 2, the gas lens 3, the electrode collet 4, the tungsten electrode rod 5, the constricted nozzle 6, the heat insulating cover 8, and the like are configured to have the same shape and the same structure as the respective members of the TIG welding torch 1 with a constricted nozzle shown in FIGS. 1 to 5. The same parts and members as those of the TIG welding torch 1 with a constricted nozzle shown in FIGS. 1 to 5 are denoted by the same reference numerals, and detailed descriptions thereof are omitted.

The electrode nozzle 7 is made of a metal material having conductivity and configured to have a tapered cylindrical shape at the distal end portion, and includes a cylindrical portion 7a attached in a fitted state to the outer peripheral surface of the stepped portion 2f with a small-diameter side formed on the outer peripheral surface of the distal end portion of a cylindrical insulator 2″ of the torch body 2, and connected to the terminal 18a of the ground cable 18, a cylindrical tapered portion 7b continuously provided with the cylindrical portion 7a and configured to have a tapered shape toward the distal end portion side, a plurality of hole-shaped gas vent ports 7c provided at predetermined intervals in the circumferential direction in the cylindrical portion 7a for discharging the shielding gas G in the electrode nozzle 7 to the outside, and a terminal fastener 19 provided in the proximal end portion of the cylindrical portion 7a for connecting the terminal 18a of the ground cable 18 to the cylindrical portion 7a.

In the present embodiment, the electrode nozzle 7 is made of oxygen-free copper having conductivity, and four hole-shaped gas vent ports 7c are provided every 90 degrees along the circumferential direction in the cylindrical portion 7a. Further, the nozzle diameter of the electrode nozzle 7 (the inner diameter of the distal end opening of the cylindrical tapered portion 7b) is set to 3 mm, the distance between the distal end surface of the electrode nozzle 7 and the distal end of the tungsten electrode rod 5 is set to 0.5 mm, and the outer diameter of the cylindrical portion 7a of the electrode nozzle 7 is set to 1 mm smaller diameter of the outer diameter of the stepped portion 2g of the large diameter formed on the outer peripheral surface of the distal end portion of the cylindrical insulator 2″, respectively.

The TIG welding torch 1 with a constricted nozzle for spot welding shown in FIGS. 14 and 15 may have the same function effect as the TIG welding torch 1 with a constricted nozzle shown in FIGS. 1 to 5.

Figure 16:
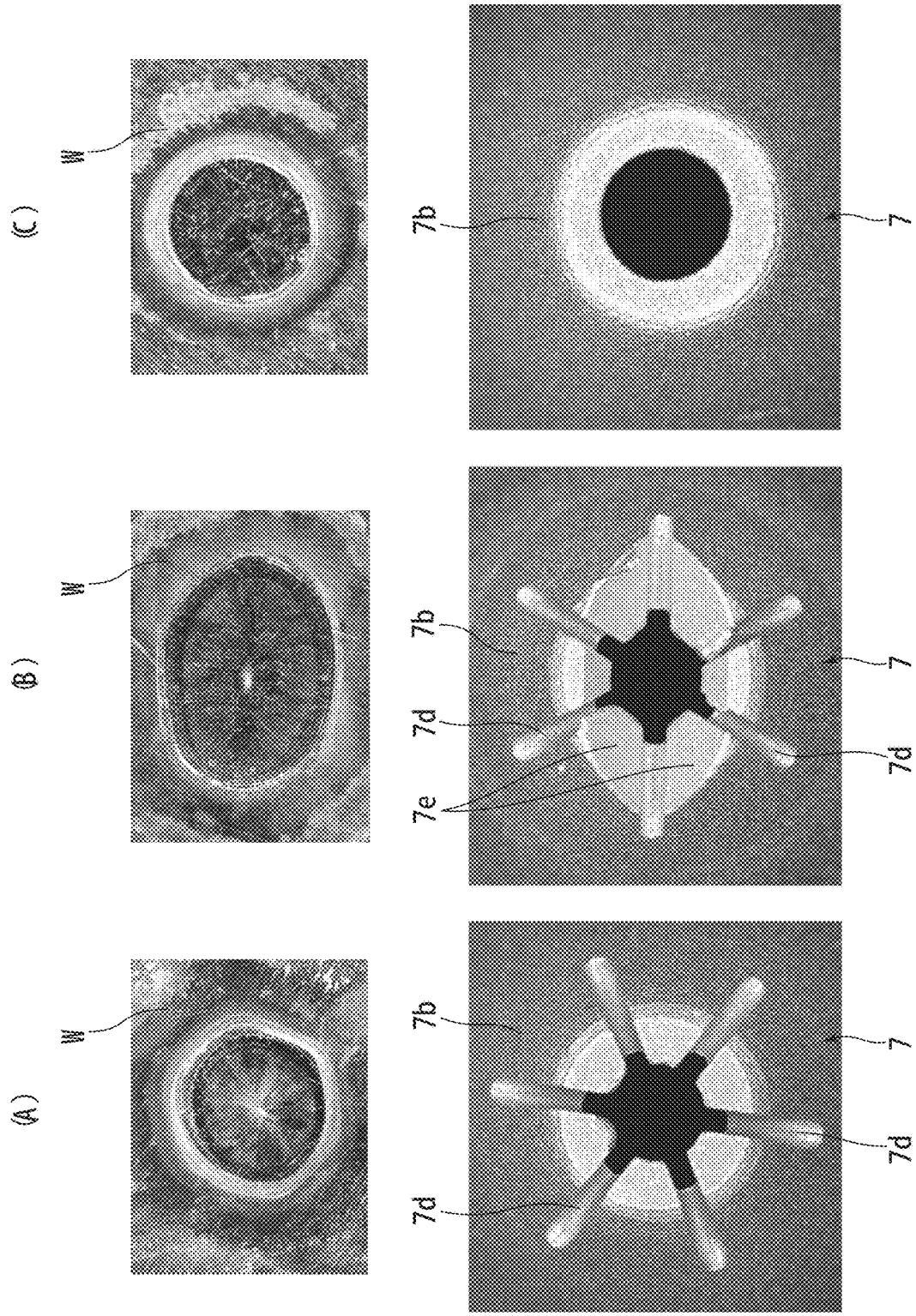
FIG. 16 shows a result of spot welding to the metal plate (base material) using the electrode nozzle shown in FIGS. 10, 13, and 15, (A) is an enlarged bottom view of the electrode nozzle shown in FIG. 10 and an enlarged plan view of the welded portion, (B) is an enlarged bottom view of the electrode nozzle shown in FIG. 13 and an enlarged plan view of the welded portion, (C) is an enlarged bottom view of the electrode nozzle shown in FIG. 15 and an enlarged plan view of the welded portion.

FIG. 16 shows the portion of spot welding to a stainless steel plate using the TIG welding torch 1 with a constricted nozzle including the electrode nozzle 7 shown in FIG. 10, FIG. 13, and FIG. 15, (A) shows the spot welding portion using the electrode nozzle 7 shown in FIG. 10, (B) shows the spot welding portion using the electrode nozzle shown in FIG. 13, (C) shows the spot welding portion using the electrode nozzle shown in FIG. 15.

The shape of each spot welding is affected by the opening shape of the distal end of the electrode nozzle, the electrode nozzle shown in FIG. 10 is a substantially hexagonal spot welding portion as shown in (A), the electrode nozzle 7 shown in FIG. 13 is an elliptical spot welding portion as shown in (B), and the electrode nozzle 7 shown in FIG. 15 is a circular spot welding portion as shown in (C).

In addition, the electrode nozzle 7 shown in FIG. 5, FIG. 10, FIG. 13, and FIG. 15 may be mounted on other types of TIG welding torch with a constricted nozzle. For example, instead of the shielding nozzle of the TIG welding torch with a constricted nozzle described in Japanese Patent No. 5602974 or Japanese Patent No. 5887445, the electrode nozzle 7 shown in FIG. 5, FIG. 10, FIG. 13, and FIG. 15 may be mounted.

Further, in the electrode nozzle 7 shown in FIG. 5, FIG. 10, FIG. 13, and FIG. 15, four circular hole-shaped gas vent ports 7c are provided on the cylindrical portion 7a respectively, in the electrode nozzle 7 shown in FIG. 5, FIG. 10, and FIG. 13, two or six slit-shaped and groove-shaped gas vent ports 7d are provided on the cylindrical tapered portion 7b. However, the numbers and shapes of the hole-shaped gas vent ports 7c and the slit-shaped and groove-shaped gas vent ports 7d are not limited to those according to the above embodiments, as long as the turbulence of the gas in the electrode nozzle 7 can be prevented, at the same time the metallic vapors M in the electrode nozzle 7 can be discharged to the outside, and spot-welding can be performed reliably and satisfactorily.

Moreover, in the electrode nozzle 7 shown in FIG. 5, FIG. 10, and FIG. 13, although the slit-shaped and groove-shaped gas vent ports 7d of the distal end was provided at equal angles, the slit-shaped and groove-shaped gas vent ports 7d may be provided by changing the angles as appropriate.

FIGS. 17 to 21 show the TIG welding torch 1 with a constricted nozzle for spot welding according to the fifth embodiment of the present invention. The TIG welding torch 1 with a constricted nozzle is used for spot welding (temporary welding) of two base metals W (metal plate W) such as stainless steel plate, steel plate, copper plate, and aluminum plate, etc., wherein the electrode nozzle 7 is divided into upper and lower two parts, the lower end portion side may be replaced with other shapes, and may correspond to various joint shapes (butt joint, corner joint, edge joint, T joint, lap joint, etc.). Further, the cost of the electrode nozzle 7 itself is reduced, and the need for attaching and detaching operation of the ground cable 18 at the time of replacement of the lower end side of the electrode nozzle 7 is eliminated, moreover the replacement of the tungsten electrode rod 5 is made easier.

Figure 17:
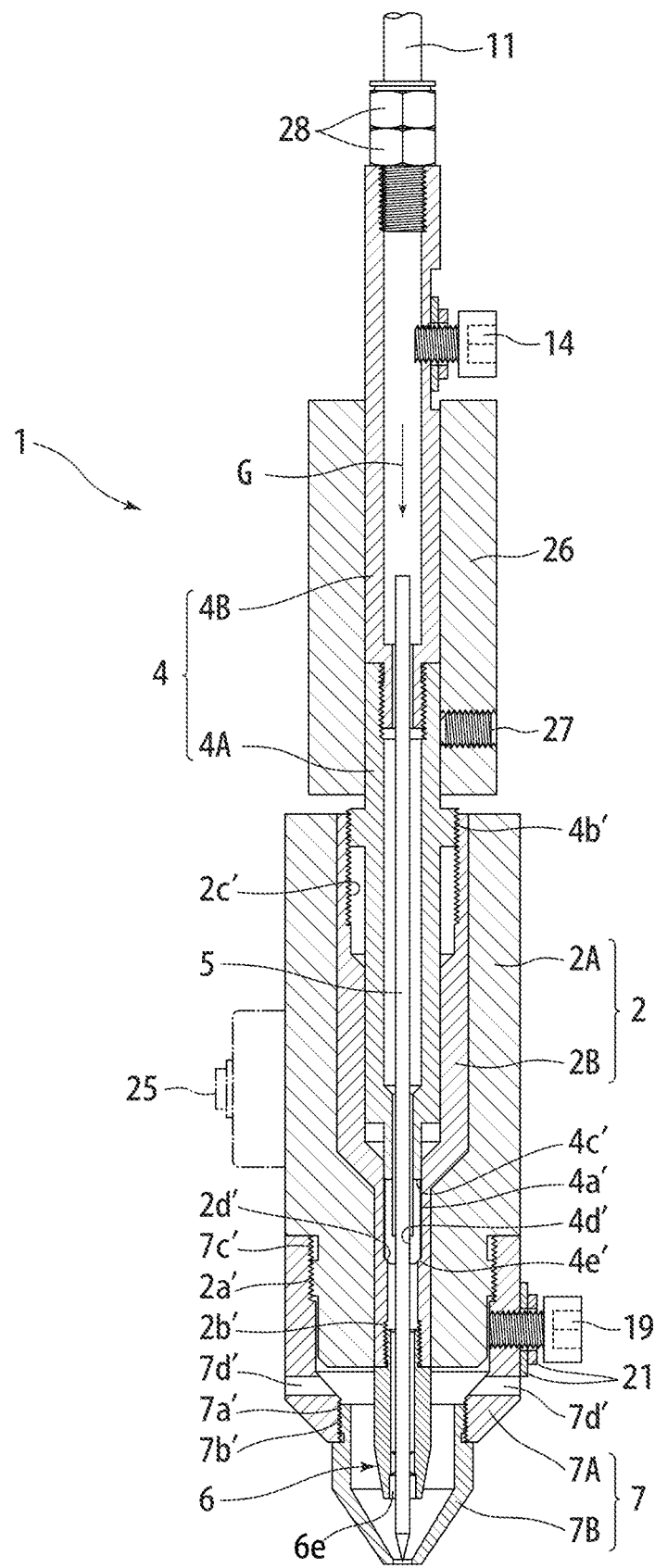
FIG. 17 is a longitudinal front view of a TIG welding torch with a constricted nozzle for spot welding according to a fifth embodiment of the present invention.
Figure 18:
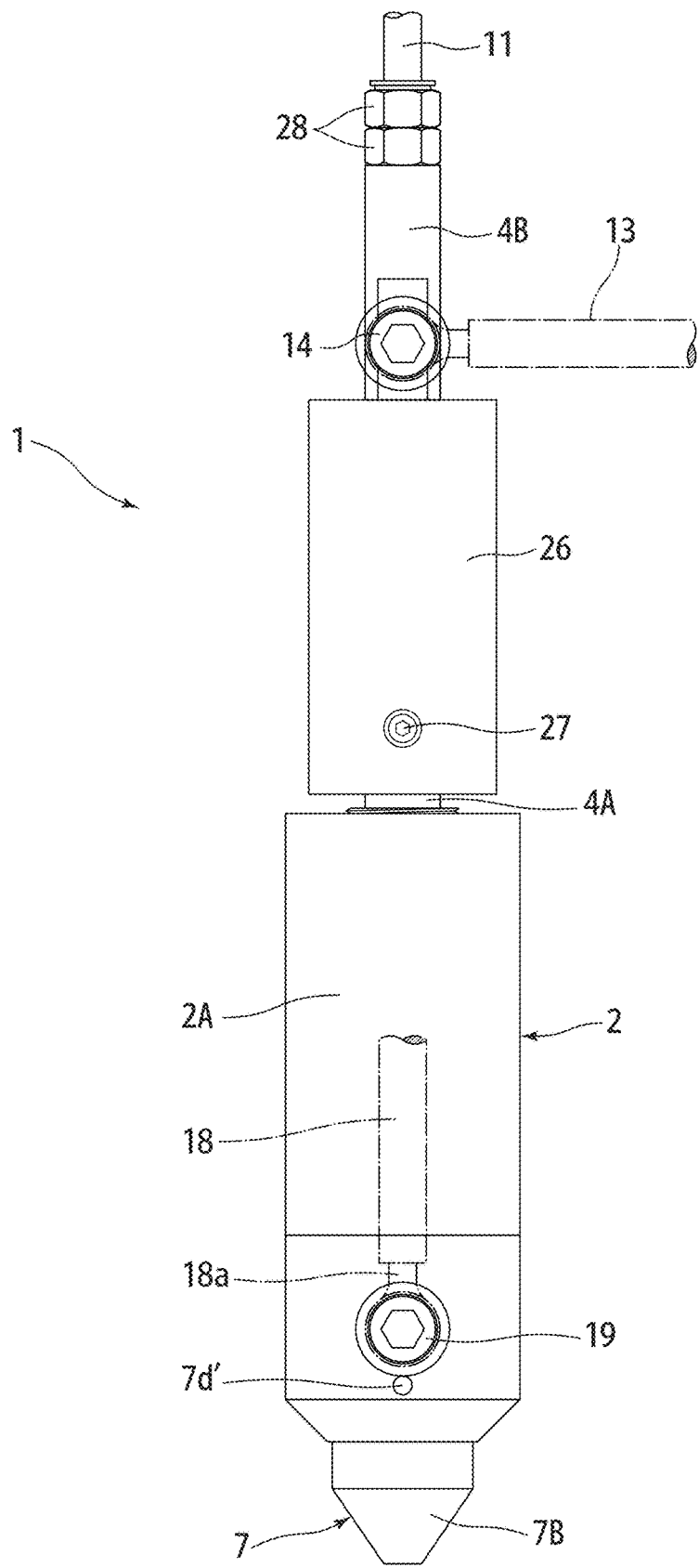
FIG. 18 is a side view of a TIG welding torch with a constricted nozzle shown in FIG. 17.
Figure 19:
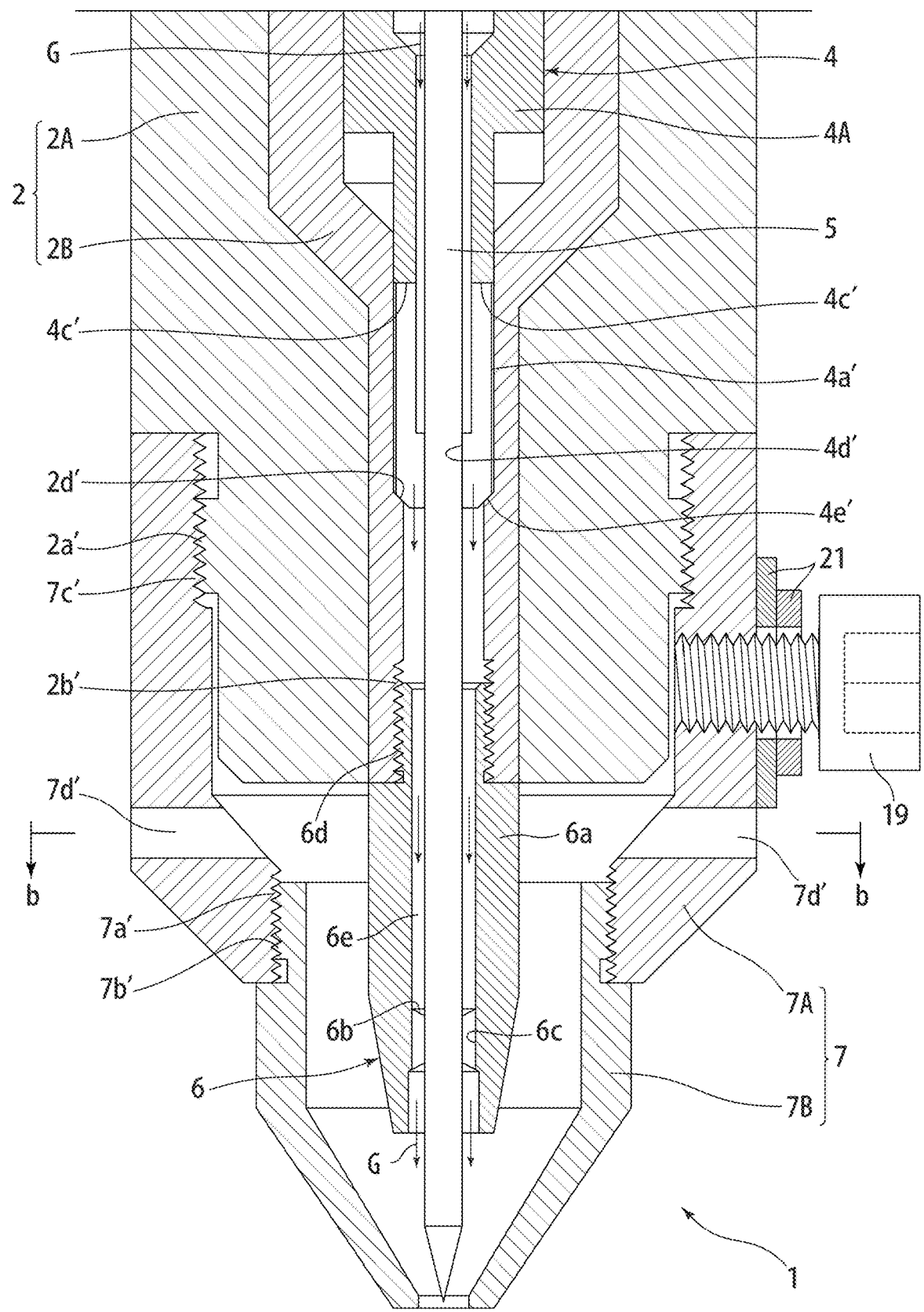
FIG. 19 is an enlarged longitudinal front view of the main part of the TIG welding torch with a constricted nozzle shown in FIG. 17.

The TIG welding torch 1 with a constricted nozzle, as shown in FIGS. 17 to 19, is provided with a cylindrical torch body 2, a cylindrical electrode collet 4 removably inserted into the torch body 2 for passing the shielding gas G, a tungsten electrode rod 5 detachably inserted into the electrode collet 4 and connected to the cathode, a constricted nozzle 6 supporting the tungsten electrode rod 5 concentrically, forming an annular gas passage 6e, into which the shielding gas G flows, between the tungsten electrode rod 5 and the constricted nozzle 6, and discharging the shielding gas G around the tungsten electrode rod 5 at a high speed, a cylindrical electrode nozzle 7 having conductivity and connected to the anode via the ground cable 18, arranged concentrically with the tungsten electrode rod 5 on the outer circumference of the constricted nozzle 6, and configured to have a tapered shape wherein the distal end portion of the tapered shape is positioned outward from the distal end of the tungsten electrode rod 5, wherein the electrode nozzle 7 is divided into upper and lower two parts, and configured to have gas vent ports 7d' provided on the electrode nozzle 7 for discharging the shielding gas G and the metal vapor M generated from the molten pool in the electrode nozzle 7 to the outside.

In addition, in FIGS. 17 and 18, the numeral 26 is a cylindrical collet holder made of an insulating material (e.g., fabric-containing Bakelite) for covering the intermediate portion of the electrode collet 4, the numeral 27 is a setscrew for fixing the collet holder 26 to the electrode collet 4, the numeral 11 is a gas hose for supplying shielding gas connected to the proximal end portion of the electrode collet 4 via a hose connection fitting 28, the numeral 13 is a torch cable connected and fixed to the electrode collet 4 by a cable setscrew 14, the numeral 18 is a ground cable connected and fixed to the electrode nozzle 7 by a terminal fastener 19, the numeral 25 is a torch switch provided on the torch body 2 and connected to the power supply control unit 22 via a switch cable (not shown).

As shown in FIG. 17, the torch body 2 includes a cylindrical torch main body 2A made of an insulating material (for example, Bakelite with cloth), configured to have a small diameter at the distal end portion (a lower end portion of the torch body 2 shown in FIG. 17), and a cylindrical connection fitting 2B made of a material having conductivity (for example, brass or copper), configured to have a small diameter at the distal end portion, and inserted and fixed into the torch main body 2A. In the distal end portion with small diameter of the torch main body 2A, a male screw 2$a'$ is provided for detachably screwing the electrode nozzle 7.

Further, on the inner peripheral surface of the distal end side of the small-diameter portion of the cylindrical connection fitting 2B, a female screw 2$b'$ is provided for detachably screwing the constricted nozzle 6. On the inner peripheral surface of the proximal end portion of the large-diameter portion of the cylindrical connection fitting 2B (upper end portion of the cylindrical connection fitting 2B shown in FIG. 17), a female screw 2$c'$ is provided for vertical movably screwing the electrode collet 4.

Furthermore, on the inner peripheral surface of the middle portion of the small-diameter portion of the cylindrical connection fitting 2B, a first tapered surface 2$d'$ is configured to gradually reduce diameter toward the distal end of the cylindrical connecting bracket 2B.

The electrode collet 4, as shown in FIG. 17, is provided with a cylindrical collet main body 4A which is made of brass (or copper), configured to have a small-diameter collet chuck portion 4$a'$ radially scalable toward the radial direction at the distal end portion (the lower end portion of the electrode collet 4 shown in FIG. 17), and have a male screw 4$b'$ provided on a part of the outer peripheral surface of the large-diameter portion of the proximal end side for being screwed axially (vertical movement) to a female screw 2$c'$ provided on the inner peripheral surface of the proximal end side of the large-diameter portion of the cylindrical connection fitting 2B of the torch body 2. Further the electrode collet 4 is provided with a cylindrical cable/hose connection fitting 4B, made of brass (or copper), connected to a gas hose 11 via a hose connection fitting 28 provided on the proximal end portion, and screwed to the proximal end of the collet main body 4A at the distal end portion in a straight line with the collet main body 4A. The shielding gas G supplied from the gas hose 11 flows sequentially in the cable/hose connecting fitting 4B and the collet body 4A. The inner diameter of the cable/hose connection fitting 4B of the electrode collet 4 and the inner diameter of the collet body 4A are configured to be larger than the outer diameter of the tungsten electrode rod 5. Annular passages, in which the shielding gas G flows, are defined between the inner peripheral surface of the cable/hose connection fitting 4B and the outer peripheral surface of the tungsten electrode rod 5, and between the inner peripheral surface of the collet body 4A and the outer peripheral surface of the tungsten electrode rod 5.

Further, as shown in FIG. 19, the collet chuck portion 4$a'$ of the collet main body 4A is provided with a split groove 4$c'$ capable of flowing the shielding gas G, and a convex portion 4$d'$ on the inner peripheral surface of the distal end portion of the collet chuck portion 4$a'$ for gripping the tungsten electrode rod 5.

Furthermore, as shown in FIG. 19, a second tapered surface 2$e'$ engaged with the first tapered surface 2$d'$ of the cylindrical connection fitting 2B is provided at the distal end of the collet chuck portion 4$a'$ of the collet main body 4A. Accordingly, as the electrode collet 4 is screwed into the cylindrical connection fitting 2B of the torch body 2, the second tapered surface 4$e'$ provided on the collet chuck portion 4$a'$ of the electrode collet 4 is engaged with the first tapered surface 2$d'$ of the cylindrical connection fitting 2B, and the collet chuck portion 4$a'$ of the electrode collet 4 is tightened in a diameter-reducing direction, and the tungsten electrode rod 5 inserted into the electrode collet 4 is gripped by the convex portion 4$d'$ of the collet chuck portion 4$a'$. At this time, even though the width of the split groove 4$c'$ of the collet chuck portion 4$a'$ is constricted by tightening the collet chuck portion 4$a'$, the width of the split groove 4$c'$ is set to a dimension so as to form a gap capable of flowing the shielding gas G. Therefore, the shielding gas G passing through the split groove 4$c'$ of the collet chuck portion 4$a'$ is able to flow into the interior of the constricted nozzle 6 through the annular passage defined between the inner peripheral surface of the small-diameter portion of the cylindrical connection fitting 2B and the outer peripheral surface of the tungsten electrode rod 5.

The constricted nozzle 6 is arranged on the outer circumference of the distal end portion of the tungsten electrode rod 5 for supporting the tungsten electrode rod 5 concentrically with the distal end portion of the tungsten electrode rod 5 in a protruding state, and configured to have an annular gas passage 6$e$ between the tungsten electrode rod 5 and the constricted nozzle 6, wherein the constricted nozzle ejects the shielding gas G from the gas passage 6$e$ to the periphery of the distal end portion of the tungsten electrode rod 5 at a high speed.

Figure 20:
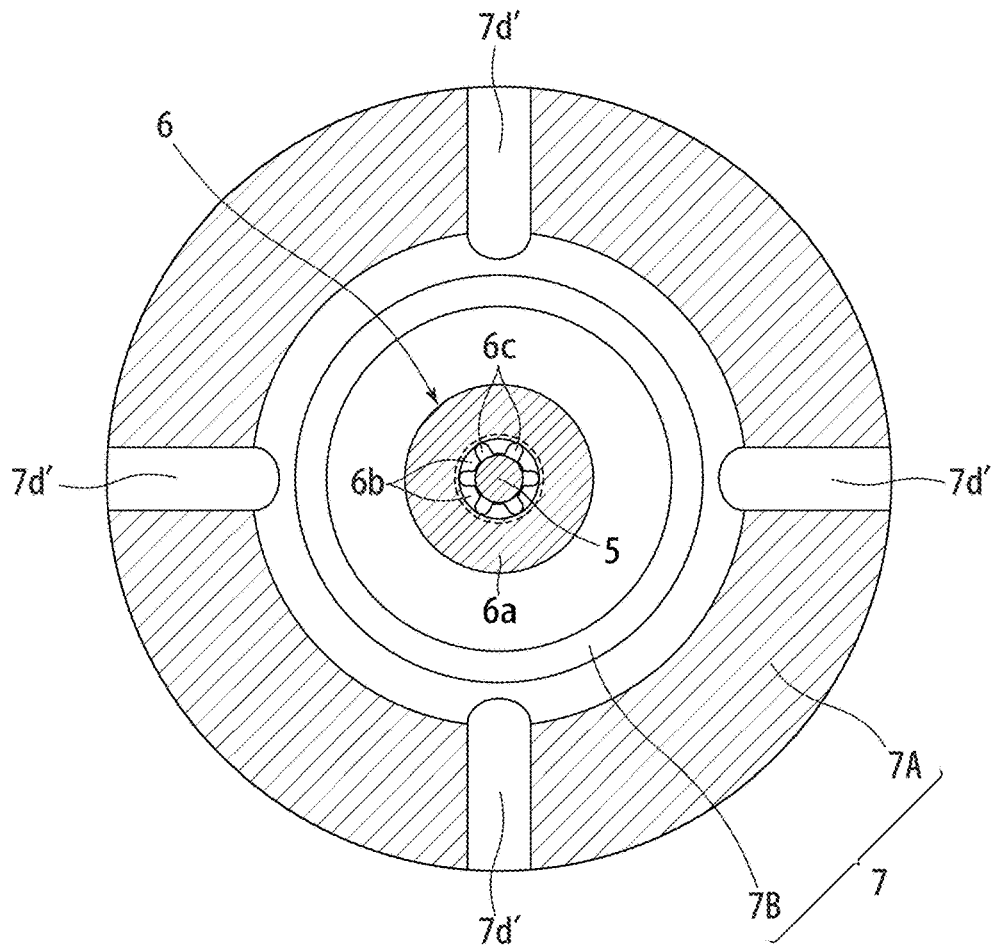
FIG. 20 is a sectional view taken along line b-b of FIG. 19.

That is, the constricted nozzle 6 is made of a copper material (beryllium copper or chromium copper) having excellent conductivity and strength, and configured to have a cylindrical-shaped body. As shown in FIGS. 19 and 20, the constricted nozzle 6 includes a cylindrical nozzle main body 6$a$ arranged concentrically with the tungsten electrode rod 5 around the distal end portion of the tungsten electrode rod 5 and configured to have an annular gas passage 6$e$ between the outer peripheral surface of the distal end portion of the tungsten electrode rod 5 and the constricted nozzle 6, a plurality of positioning ridge 6$b$ protruding at predetermined intervals in the circumferential direction on the inner peripheral surface of the nozzle body 6$a$ and holding the tungsten electrode rod 5 at the center position of the nozzle main body 6$a$ along the longitudinal direction of the nozzle main body 6$a$, and a plurality of gas rectifying grooves 6$c$ extending parallel to the longitudinal direction of the nozzle main body 6$a$ between the plurality of positioning ridge 6$b$ and rectifying the shielding gas G flowing in the gas passage 6$e$, wherein a male screw 6$d$ is provided on the outer peripheral surface of the proximal end portion of the nozzle main body 6$a$ (the upper-end portion of the nozzle main body 6$a$ shown in FIG. 19), and is detachably screwed to a female screw 2$b'$ provided on the inner peripheral surface of the distal end portion of the cylindrical connection fitting 2B of the torch body 2.

Further, the positioning ridge 6$b$ and the gas rectifying groove 6$c$, as shown in FIG. 20, are arranged at equal angles in the circumferential direction on the inner peripheral surface of the nozzle main body 6$a$, respectively, so that the shielding gas G from the distal end opening of the nozzle main body 6$a$ flows evenly around the distal end portion of the tungsten electrode rod 5.

Further, the positioning ridge 6$b$ and the gas rectifying groove 6$c$ are provided at a location away from the distal end of the nozzle main body 6$a$. Further, the inner diameters of the gas passage 6$e$ located downstream of the positioning ridge 6$b$ and the gas rectifying groove 6$c$ are configured to be larger than the inner diameters of the gas passage 6$e$ located upstream of the positioning ridge 6$b$ and the gas rectifying groove 6$c$. Consequently, the shielding gas G flowing into the gas passage 6$e$ is rectified by passing through the gas rectifying groove 6c and stabilized at the downstream side of the gas passage 6e, and then discharged from the distal end opening of the nozzle body 6a.

The electrode nozzle 7 is made of a metal material having conductivity and configured to have a cylindrical shape with a tapered distal end portion, and vertically divided into two portions so that the lower end portion side (distal end portion side) can be replaced by another shape.

Figure 21:
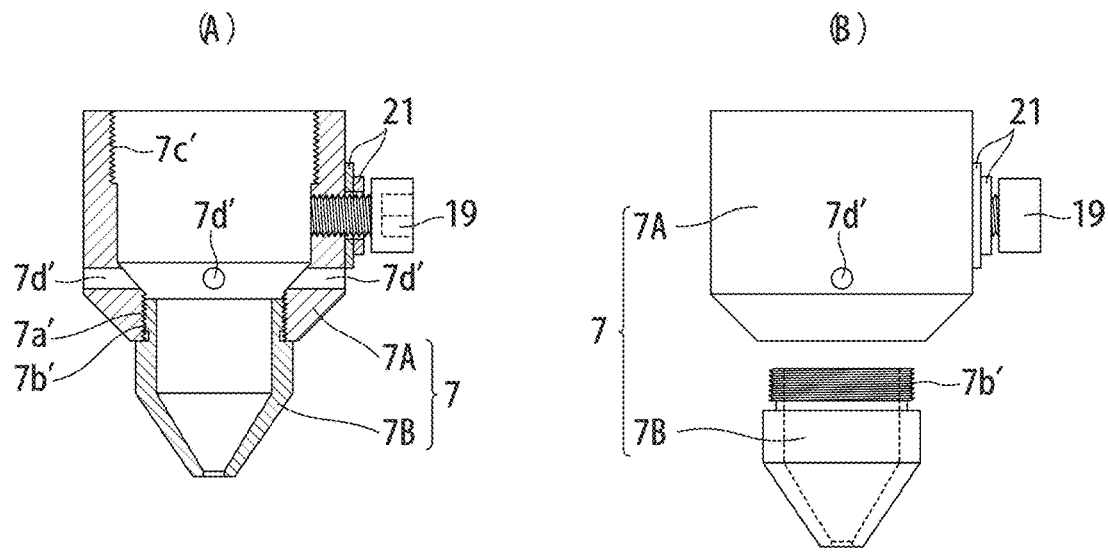
FIG. 21 shows an electrode nozzle used in the TIG welding torch with a constricted nozzle shown in FIG. 17, (A) is an enlarged longitudinal sectional view of the electrode nozzle, (B) is an enlarged front view of a state of decomposing the electrode nozzle into upper and lower parts.

That is, the electrode nozzle 7, as shown in FIG. 21, includes a cylindrical nozzle main body 7A having conductivity, vertically divided into two portions, attached to the distal end portion of the torch body 2, and connected to the ground cable 18, which is connected to the anode, and a cylindrical nozzle tip 7B having conductivity, configured to have a tapered shape at the distal end portion, and detachably attached to the distal end portion of the nozzle body 7A.

Further, the nozzle main body 7A and the nozzle tip 7B are detachably by a female screw 7a' provided on the inner peripheral surface of the lower end portion of the nozzle main body 7A and a male screw 7b' provided on the outer peripheral surface of the proximal end portion of the nozzle tip 7B, which is screwed to the female screw 7a', so that the nozzle tip 7B may be replaced with a nozzle tip 7B having another shape.

Furthermore, the nozzle main body 7A is configured to have a larger diameter than the nozzle tip 7B. A female screw 7c' is provided on the inner peripheral surface of the proximal end portion of the nozzle main body 7A, and detachably screwed to a male screw 2a' provided on the outer peripheral surface of the distal end portion of the torch main body 2A. A plurality of hole-shaped gas vent ports 7d' is provided at predetermined intervals in the circumferential direction in the distal end portion of the nozzle main body 7A, for discharging the shielding gas G in the electrode nozzle 7 to the outside together with the metal vapor M generated from the molten pool.

Moreover, the nozzle main body 7A is provided with a terminal fastener 19 for connecting the terminal 18a of the ground cable 18 to the nozzle main body 7A. The terminal fastener 19 consists of bolts screwed to the peripheral wall of the nozzle main body 7A through a washer 21. In addition, the terminal fastener 19 may be a terminal fastener 19 consisting of a headless screw 19a and a nut 19b shown in FIG. 1.

Then, when the electrode nozzle 7 is attached to the distal end portion of the torch body 2, the electrode nozzle is arranged concentrically with the distal end portion of the tungsten electrode rod 5 protruding from the distal end portion of the constricted nozzle 6. The distal end of the electrode nozzle 7 is located further outside than the distal end of the tungsten electrode rod 5. Therefore, the distal end portions of the constriction nozzle 6 and the tungsten electrode rod 5 are covered with the electrode nozzle 7.

In the present embodiment, the nozzle main body 7A of the electrode nozzle 7 is made of a cheaper brass having conductivity, and the nozzle tip 7B of the electrode nozzle 7 is made of oxygen-free copper having conductivity. Further, four hole-shaped gas vent ports 7d' are provided at every 90 degrees along the circumferential direction on the nozzle main body 7A. Moreover, the nozzle diameter of the electrode nozzle 7 (inner diameter of the distal end opening of the nozzle tip 7B) is set to 2 mm, and the distance between the distal end surface of the electrode nozzle 7 and the distal end of the tungsten electrode rod 5 is set to 0.5 mm, respectively.

In addition, the number, shape, and size of the hole-shaped gas vent ports 7d' are set so as to be able to discharge the shielding gas G in the electrode nozzle 7 to the outside and prevent turbulence of the shielding gas G in the electrode nozzle 7, as well as to reliably discharge the metal vapor generated from the molten pool to the outside.

Further, the nozzle diameter of the electrode nozzle 7 (inner diameter of the distal end opening of the nozzle tip 7B) is determined in accordance with the welding current, and the size of the molten pool (outer diameter) may be adjusted by changing the welding current and the nozzle diameter of the electrode nozzle 7.

Thus, when spot welding is performed on the base material W by using the TIG welding torch 1 with a constricted nozzle shown in FIG. 17, the distal end surface of the electrode nozzle 7 is brought into contact with the spot welding portion of the base material W in a surface contact state.

At this time, welding conditions such as the welding current, the flow rate of the shielding gas G, the type of the shielding gas G, the welding time, and the like, are set under optimum conditions in accordance with the quality and the plate thickness of the base material W. Further, the tungsten electrode rod 5 is the cathode, and the electrode nozzle 7 is the anode. Therefore, the spot where the electrode nozzle 7 of the base material W is in contact is the ground.

When the electrode nozzle 7 is brought into contact with the base material W, the torch switch 25 is pressed. Then, the shielding gas G is supplied to the TIG welding torch 1 with a constricted nozzle. After the flow of the shielding gas G is stabilized, a voltage is applied between the tungsten electrode rod 5 and the base material W. Then, arc (arc plasma) is generated for a predetermined time between the distal end of the tungsten electrode rod 5 and the base material W in an atmosphere of the shielding gas G. Thus, a part of the base material W is melted, and spot welding is performed on the base material W.

In addition, the shielding gas G supplied to the TIG welding torch 1 with a constricted nozzle flows down in the electrode collet 4, and flows into the gas passage 6e of the constricted nozzle 6.

The shielding gas G flowing into the gas passage 6e increases in speed and a high-speed gas, Also, the shielding gas G is rectified by passing through a plurality of gas rectifying grooves 6c, changed to a high-speed rectifying gas, and discharged from the distal end opening of the nozzle main body 7A in a straight line around the arc.

The shielding gas G discharged from the constricted nozzle 6 flows around the distal end portion of the tungsten electrode rod 5 and flows into the space in the electrode nozzle 7. Then the shielding gas G is discharged to the outside from the hole-shaped gas vent ports 7d' provided on the nozzle main body 7A of the electrode nozzle 7.

Figure 22:
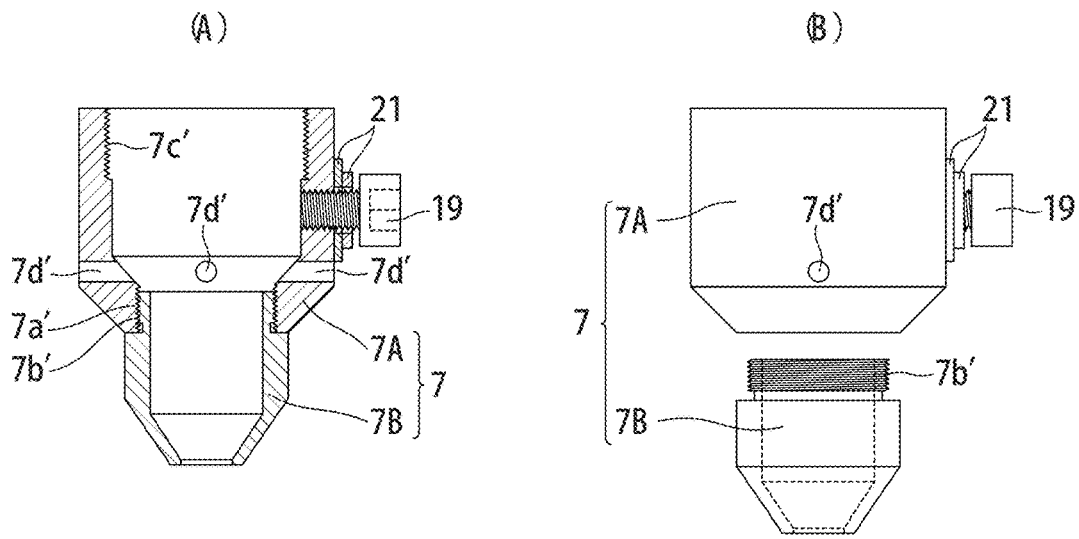
FIG. 22 shows another example of an electrode nozzle used in the TIG welding torch with a constricted nozzle shown in FIG. 17, (A) is an enlarged longitudinal sectional view of the electrode nozzle, (B) is an enlarged front view of a state of decomposing the electrode nozzle into upper and lower parts.

FIG. 22 shows another example of the electrode nozzle 7 used in the TIG welding torch 1 with a constricted nozzle shown in FIG. 17. The electrode nozzle 7 is provided with a cylindrical nozzle main body 7A having conductivity for connecting to the ground cable 18 connected to the anode, and attached to the distal end portion of the torch body 2, and a cylindrical nozzle tip 7B having conductivity, configured to have a tapered shape at the distal end portion, and detachably attached to the distal end portion of the nozzle main body 7A, wherein only the nozzle tip 7B is replaced by a nozzle tip 7B of another shape.

That is, as shown in FIG. 22, the inner diameter of the distal end opening of the nozzle tip 7B is configured to be larger than the inner diameter of the distal end opening of the nozzle tip 7B shown in FIG. 21, and the shape and structure of the other portions are configured to be the same shape and structure as the nozzle tip 7B shown in FIG. 21. The nozzle main body 7A shown in FIG. 22 is the same as the nozzle main body 7A shown in FIG. 21, and the same parts and members are denoted by the same reference numerals.

Figure 23:
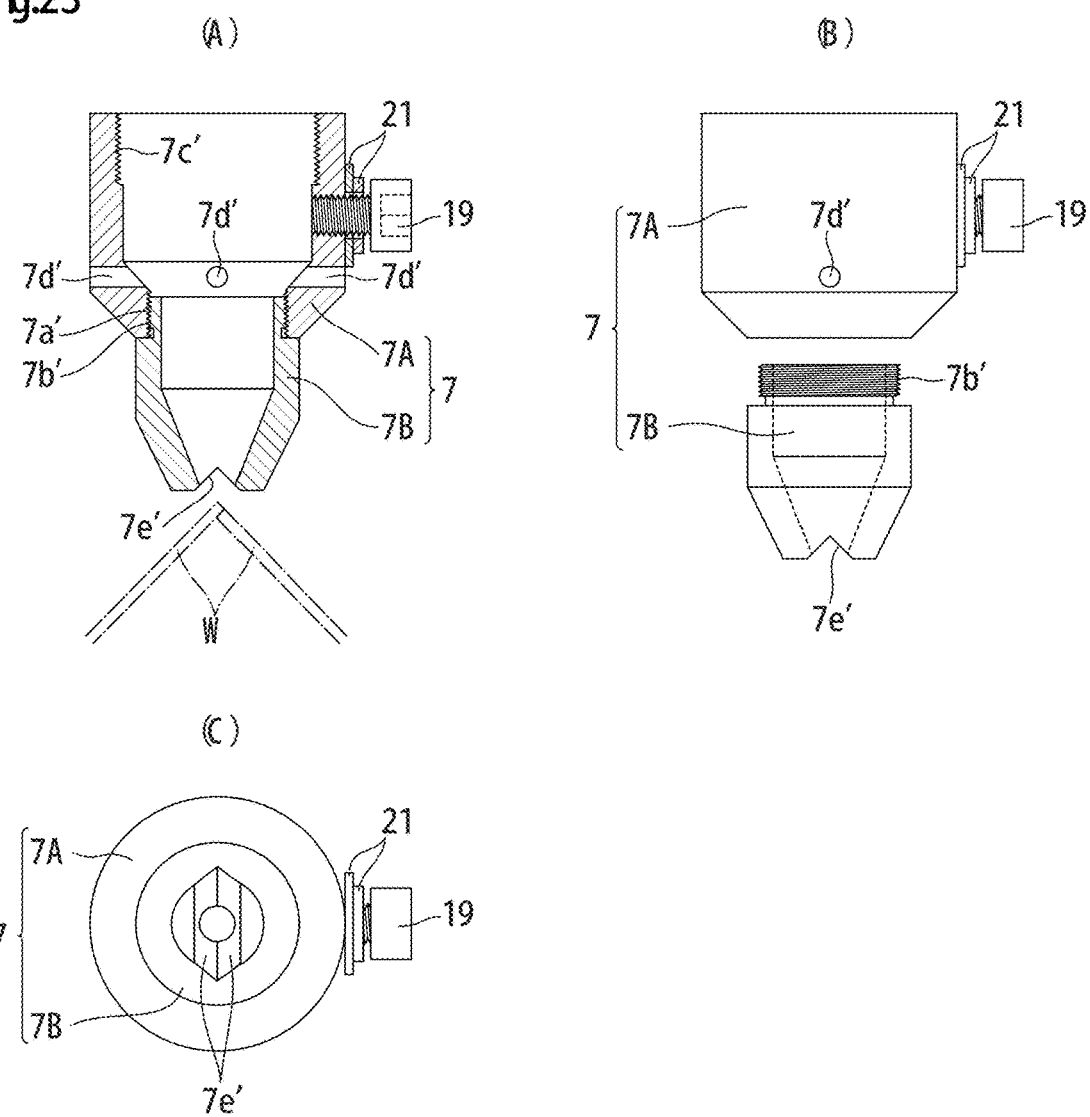
FIG. 23 is another example of the electrode nozzle used in the TIG welding torch with a constricted nozzle shown in FIG. 17, (A) is an enlarged longitudinal sectional view of the electrode nozzle, (B) is an enlarged front view of a state of decomposing the electrode nozzle into upper and lower parts, (C) is an enlarged bottom view of the electrode nozzle.

FIG. 23 shows another example of the electrode nozzle 7 used in the TIG welding torch 1 with a constricted nozzle shown in FIG. 17. The electrode nozzle 7 is provided with a cylindrical nozzle main body 7A having conductivity for connecting to the ground cable 18 connected to the anode, and attached to the distal end portion of the torch body 2, and a cylindrical nozzle tip 7B having conductivity, configured to have a tapered shape at the distal end portion, and detachably attached to the nozzle main body 7A, wherein only the nozzle tip 7B is replaced by a nozzle tip 7B of another shape.

That is, as shown in FIG. 23, the nozzle tip 7B is configured to have a V-shaped positioning groove 7e' on the distal end surface of the nozzle tip 7B along the diametrical direction of the nozzle tip 7B for fitting to the corner portion of the corner joint. The shape and structure of the other portions are configured to be the same shape and structure as the nozzle tip 7B shown in FIG. 21. In addition, the nozzle main body 7A shown in FIG. 23 is the same as the nozzle main body 7A shown in FIG. 21, and the same parts and members are denoted by the same reference numerals.

Figure 24:
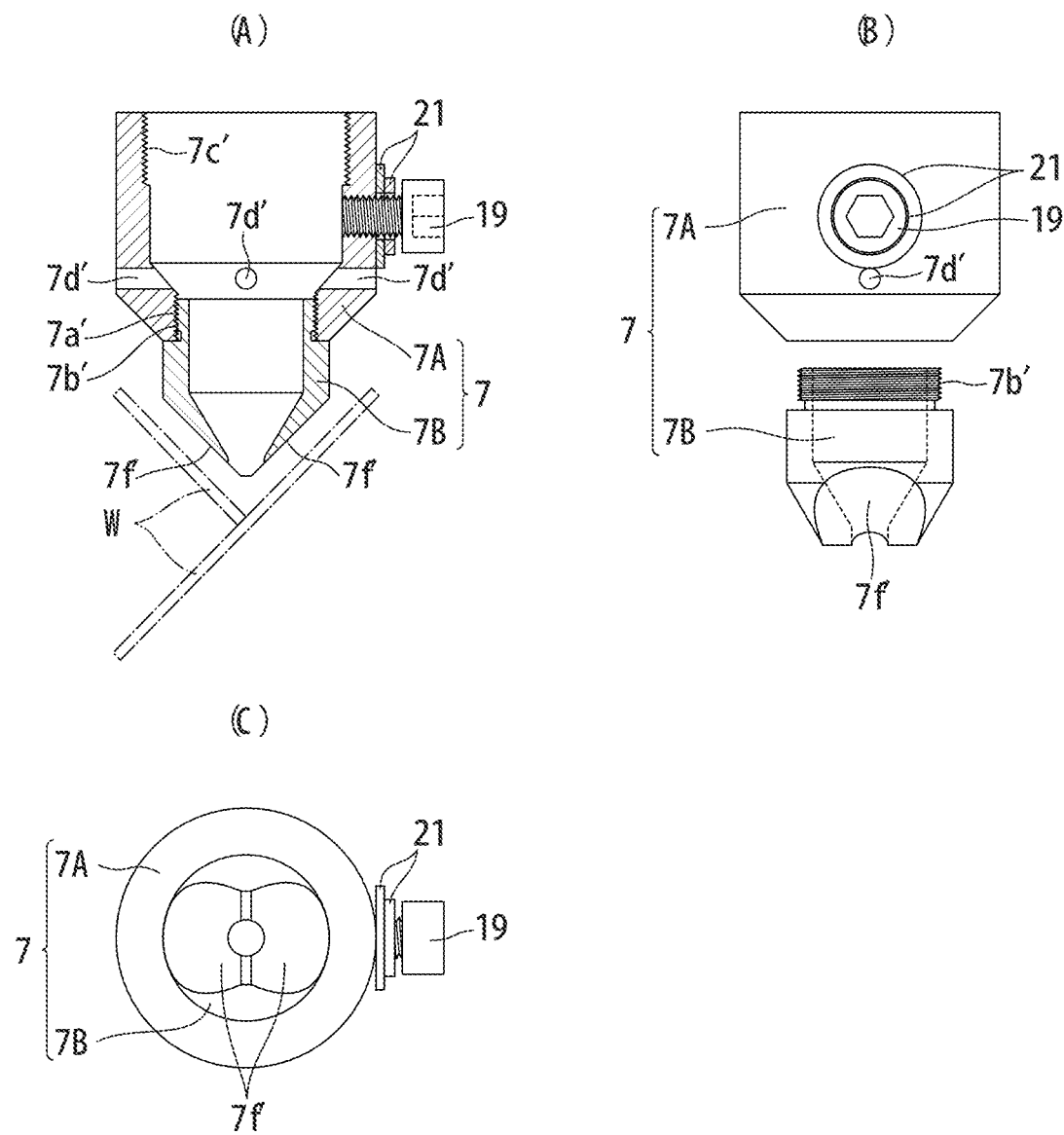
FIG. 24 is another example of the electrode nozzle used in the TIG welding torch with a constricted nozzle shown in FIG. 17, (A) is an enlarged longitudinal sectional view of the electrode nozzle, (B) is an enlarged front view of a state of decomposing the electrode nozzle into two upper and lower, (C) is an enlarged bottom view of the electrode nozzle.
Figure 25:
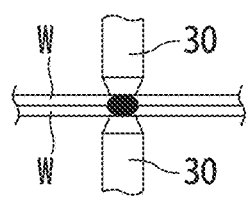
FIG. 25 shows the welding method used for spot welding, (A) is resistance welding, (B) is laser welding, (C) is plasma welding, and (D) is TIG welding.
Figure 25:
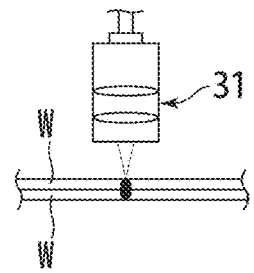
Figure 25:
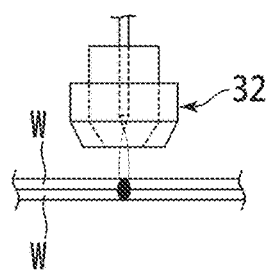
Figure 25:
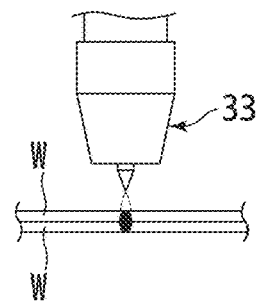
Figure 26:
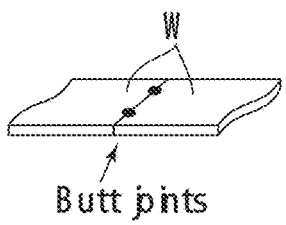
FIG. 26 shows the shape of the joint when spot welding is performed by TIG welding, (A) is a butt joint, (B) is a corner joint, (C) is a edge joint, (D) is a T joint, and (E) is a lap joint.
Figure 26:
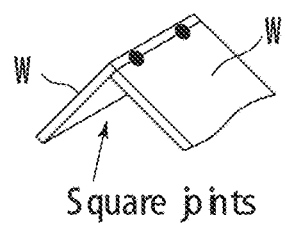
Figure 26:
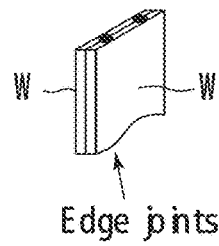
Figure 26:
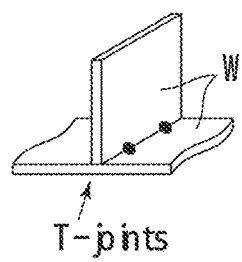
Figure 26:
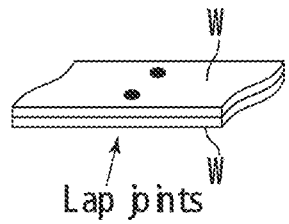

FIG. 24 shows another example of the electrode nozzle 7 used in the TIG welding torch 1 with a constricted nozzle shown in FIG. 17. The electrode nozzle 7 is provided with a cylindrical nozzle main body 7A having conductivity, for connecting to the ground cable 18 connected to the anode, and attached to the distal end portion of the torch body 2, and a cylindrical nozzle tip 7B having conductivity, configured to have a tapered shape at the distal end portion, and detachably mounted to the distal end portion of the nozzle main body 7A, wherein only the nozzle tip 7B is replaced by a nozzle tip 7B of another shape.

That is, the nozzle tip 7B, as shown in FIG. 24, is configured to have an opposing positioning surface 7f provided on the outer peripheral surface of the distal end portion of the nozzle tip 7B for contacting with the corner portion of the T-joint in a surface-contact state. The shapes and structures of the other portions are configured to be the same shapes and structures as the nozzle tip 7B shown in FIG. 21. The nozzle main body 7A shown in FIG. 24 is the same as the nozzle main body 7A shown in FIG. 21, and the same parts and members are denoted by the same reference numerals.

The TIG welding torch 1 with a constricted nozzle for spot welding shown in FIG. 17 can exert the same function effect as the TIG welding torch with a constricted nozzle shown in FIG. 1.

Moreover, the TIG welding torch 1 with a constricted nozzle shown in FIG. 17 is able to correspond to various joint shapes and only the nozzle tip 7B may be replaced with a nozzle tip 7B of another shape, since the electrode nozzle 7 is vertically divided into two parts of a cylindrical nozzle main body 7A and a cylindrical nozzle tip 7B, the ground cable 18 is connected to the nozzle main body 7A, and the nozzle tip 7B is detachable with respect to the nozzle body 7A. For example, by replacing the nozzle tip 7B with the other nozzle tip 7B shown in FIG. 23, which is configured to have a V-shaped positioning grooves 7e' for fitting to the corners of the corner joint, or with the other nozzle tip 7B shown in FIG. 24, which is configured to have an opposing positioning surface 7f for contacting with the corner of the T-joint in a surface-contact state, thereby spot-welding of the corner joint or the T-joint can be performed reliably and easily.

In addition, in the TIG welding torch 1 with a constricted nozzle shown in FIG. 17, only the nozzle tip 7B can be replaced, so that attaching/detaching the ground cable 18 connected to the nozzle body 7A becomes unnecessary.

Further, in the TIG welding torch 1 with a constricted nozzle shown in FIG. 17, different materials having conductivity may be used for the nozzle main body 7A and the nozzle tip 7B separately, for example, the nozzle main body 7A may be made of a cheaper brass, and the nozzle tip 7B may be made of copper, so that cost may be reduced compared with an electrode nozzle 7 made of copper entirely.

Moreover, in the TIG welding torch 1 with a constricted nozzle for spot welding shown in FIG. 17, by removing the gas hose 11 and loosening the collet chuck portion 4a' of the electrode collet 4, the tungsten electrode rod 5 may be replaced from the top of the torch, and the tungsten electrode rod 5 may be replaced in one touch compared to the TIG welding torch 1 with a constricted nozzle shown in FIG. 1, thereby replacement of the tungsten electrode rod 5 becomes easier.

Furthermore, since the TIG welding torch 1 with the constricted nozzle for spot welding shown in FIG. 17 allows the shielding gas G to flow from only the constricted nozzle 6, the arc is concentrated as compared with the TIG welding torch 1 with a constricted nozzle shown in FIG. 1, which allows the shielding gas G to flow from both the constricted nozzle 6 and the gas lens 3, thereby the arc start my be improved.

DESCRIPTION OF NUMERALS

1 TIG welding torch with a constricted nozzle
2 torch body
3 gas lens
4 electrode collet
5 tungsten electrode rod
6 constricted nozzle
7 electrode nozzle
7A nozzle main body
7B nozzle tip
7a cylindrical portion
7b cylindrical tapered portion
7c hole-shaped gas vent port
7d groove-shaped gas vent port
7d' hole-shaped gas vent port
7e V-shaped positioning groove
7e' V-shaped positioning groove
7f positioning surface
8 insulation cover
18 ground cable
18a terminal of the ground cable
19 terminal fastener
a arc
G shielding gas

What is claimed is:
1. A TIG welding torch for spot welding, comprising:
a torch body for passing a shield gas;
a tungsten electrode rod detachably attached to the torch body by insertion through an electrode collet, and connected to a cathode;
a constricted nozzle configured to concentrically support a distal end portion of the tungsten electrode rod, the constricted nozzle defining a gas passage through which the shield gas flows between the tungsten electrode rod and the constricted nozzle for discharging the shield gas discharged from the gas passage at a higher speed than the shield gas discharged from a tip of the torch body; and an electrode nozzle arranged concentrically with the tungsten electrode rod on an outer circumference of the constricted nozzle, the electrode nozzle having a distal end portion formed in a tapered shape, the tapered shape configured to have a tip located outward from a tip of the tungsten electrode rod, the electrode nozzle configured to have a cylindrical shape, the electrode nozzle having a conductivity for connecting to an anode via a ground cable, wherein the electrode nozzle is provided with at least one gas vent port for the shielding gas, wherein the electrode nozzle comprises:
  a cylindrical portion attached to a distal end portion of the torch body and connectable to the ground cable connected to the anode, and
  a cylindrical tapered portion continuously provided with the cylindrical portion and formed in a tapered shape toward the distal end portion side, and
wherein the at least one gas vent port comprises a plurality of hole-shaped gas vent ports provided at predetermined intervals in a circumferential direction in the cylindrical portion for discharging the shielding gas in the electrode nozzle to the outside.

2. A TIG welding torch for spot welding, comprising:
a torch body;
a tungsten electrode rod detachably attached to the torch body by insertion through an electrode collet capable of passing a shielding gas, the tungsten electrode rod being connectable to a cathode;
a constricted nozzle configured to concentrically support a distal end portion of the tungsten electrode rod, the constricted nozzle defining a gas passage through which the shielding gas flows between the tungsten electrode rod and the constricted nozzle; and
an electrode nozzle arranged concentrically with the tungsten electrode rod on an outer circumference of the constricted nozzle, the electrode nozzle having a distal end portion formed in a tapered shape, the tapered shape configured to have a tip located outward from a tip of the tungsten electrode rod, the electrode nozzle configured to have a cylindrical shape, the electrode nozzle having conductivity for connecting to an anode via a ground cable, wherein the electrode nozzle is provided with at least one gas vent port for the shielding gas,
wherein the electrode nozzle is vertically divided into two parts, the parts comprising:
  a nozzle main body having a cylindrical shape and conductivity, the nozzle main body being attached to a distal end portion of the torch body and connectable to the ground cable connected to the anode, and
  a cylindrical nozzle tip having a cylindrical shape and conductivity, configured to have a tapered shape at a distal end portion, the nozzle tip being detachably attached to the distal end portion of the nozzle main body.

3. The TIG welding torch for spot welding according to claim 1,
wherein the at least one gas vent port further comprises:
  a plurality of groove-shaped gas vent ports provided at predetermined intervals in the circumferential direction at a tip of the cylindrical tapered portion for discharging the shielding gas in the electrode nozzle to the outside.

4. The TIG welding torch for spot welding according to claim 1, wherein the electrode nozzle further comprises:
  a V-shaped positioning groove disposed along the diameter direction at a tip of the cylindrical tapered portion and configured to fit to a corner of a square joint; and
wherein the at least one gas vent port further comprises:
  a plurality of groove-shaped gas vent ports provided at predetermined intervals in a circumferential direction at a tip of the cylindrical tapered portion for releasing the shield gas in the electrode nozzle to the outside.

5. The TIG welding torch for spot welding according to claim 1, wherein the electrode nozzle further comprises a terminal fastener for connecting a terminal of the ground cable.

6. The TIG welding torch for spot welding according to claim 1, further comprising a cylindrical heat insulating cover larger than an outer diameter of the cylindrical portion, the cylindrical heat insulating cover being concentrically provided on an outer peripheral surface of the cylindrical portion of the electrode nozzle, wherein the cylindrical heat insulating cover defines an annular cooling passage, through which the shielding gas discharged from the plurality of hole-shaped gas vent ports flows between the cylindrical portion and the heat insulating cover.

7. The TIG welding torch for spot welding according to claim 2, wherein the nozzle main body further comprises a terminal fastener for connecting terminals of the ground cable.

8. The TIG welding torch for spot welding according to claim 2, wherein the nozzle tip is configured to have a V-shaped positioning groove provided on a distal end surface of the nozzle tip along a diameter direction of the nozzle tip, the V-shaped positioning groove being capable of fitting to a corner of a corner joint.

9. The TIG welding torch for spot welding according to claim 2, wherein a facing-shaped positioning surface in contact with a corner portion of a T-joint in a surface contact state is provided on an outer peripheral surface of a distal end portion of the nozzle tip.

10. The electrode nozzle of the TIG welding torch according to claim 1.

11. The electrode nozzle of the TIG welding torch according to claim 2.

12. A TIG welding torch for spot welding, comprising:
a torch body for passing a shield gas;
a tungsten electrode rod detachably attached to the torch body by insertion through an electrode collet, and connected to a cathode;
a constricted nozzle configured to concentrically support a distal end portion of the tungsten electrode rod, the constricted nozzle defining a gas passage through which the shield gas flows between the tungsten electrode rod and the constricted nozzle for discharging the shield gas discharged from the gas passage at a higher speed than the shield gas discharged from a tip of the torch body; and
an electrode nozzle arranged concentrically with the tungsten electrode rod on an outer circumference of the constricted nozzle, the electrode nozzle having a distal end portion formed in a tapered shape, the tapered shape configured to have a tip located outward from a tip of the tungsten electrode rod, the electrode nozzle configured to have a cylindrical shape, the electrode nozzle having a conductivity for connecting to an anode via a ground cable, wherein the electrode nozzle is provided with at least one gas vent port for the shielding gas, wherein the torch body comprises:
- a torch main body having a cylindrical shape, conductivity, and a plurality of discharge holes provided on a distal end surface for discharging the shielding gas to the outer circumference of the constricted nozzle; and
- a cylindrical insulator having an insulating property and fitted to an outer peripheral surface of the torch main body, and wherein a proximal end portion of the electrode nozzle is fitted and fixed to an outer peripheral surface of a distal end portion of the cylindrical insulator.

13. The TIG welding torch for spot welding according to claim 12, further comprising a gas lens for rectifying the shielding gas discharged from the discharge hole on a distal end surface of the torch body of the torch body.

14. The electrode nozzle of the TIG welding torch according to claim 12.

* * * * *